US010791162B2

United States Patent
Su et al.

(10) Patent No.: US 10,791,162 B2
(45) Date of Patent: Sep. 29, 2020

(54) MAXIMIZING QUALITY OF SERVICE FOR QOS ADAPTIVE VIDEO STREAMING VIA DYNAMIC APPLICATION-LAYER THROUGHPUT RATE SHAPING

(71) Applicant: Hughes Network Systems, LLC, Germantown, MD (US)

(72) Inventors: Chi-Jiun Su, Rockville, MD (US); Kaustubh Jain, Germantown, MD (US); Se Gi Hong, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 850 days.

(21) Appl. No.: 14/986,551

(22) Filed: Dec. 31, 2015

(65) Prior Publication Data

US 2017/0195393 A1    Jul. 6, 2017

(51) Int. Cl.
    *H04L 29/06* (2006.01)
    *H04L 12/26* (2006.01)
    *H04L 29/08* (2006.01)

(52) U.S. Cl.
    CPC .......... *H04L 65/80* (2013.01); *H04L 43/0888* (2013.01); *H04L 65/4084* (2013.01); *H04L 65/601* (2013.01); *H04L 65/605* (2013.01); *H04L 69/329* (2013.01)

(58) Field of Classification Search
    CPC ....................................................... H04L 65/80
    See application file for complete search history.

(56) References Cited

U.S. PATENT DOCUMENTS

| 2004/0057446 | A1 | 3/2004 | Varsa et al. | |
| 2005/0275758 | A1* | 12/2005 | McEvilly | H04N 7/17318 348/725 |
| 2006/0013566 | A1* | 1/2006 | Nakamura | G11B 27/034 386/240 |
| 2009/0055471 | A1* | 2/2009 | Kozat | H04L 65/4084 709/203 |

(Continued)

OTHER PUBLICATIONS

USPTO, "International Search Report and Written Opinion", PCT/US2016/069655, dated Mar. 24, 2017.

(Continued)

*Primary Examiner* — Ario Etienne
*Assistant Examiner* — Sm Z Islam
(74) *Attorney, Agent, or Firm* — Potomac Technology Law, LLC

(57) ABSTRACT

Application layer throughput (ALT) shaping is provided for a streaming media session is provided. A request for a content segment is received. The receipt time of the request is recorded and the request is forwarded to a content server. A response message is received from the server. The receipt time of the response and a segment size is determined. An ALT for the current segment is determined based on the receipt times of the request and response messages and the segment size. The ALT rate is compared to a target ALT rate required for a desired session PBR. When the ALT rate is higher than the target ALT rate, the content response is held for a time period determined to lower the current ALT rate to the target ALT rate, and then released to the client device. Otherwise, the content response is promptly provided to the client device.

16 Claims, 15 Drawing Sheets

(56) References Cited

U.S. PATENT DOCUMENTS

| | | | |
|---|---|---|---|
| 2009/0063699 A1* | 3/2009 | Chapweske | H04N 7/17318 709/233 |
| 2012/0030212 A1* | 2/2012 | Koopmans | H04N 7/17318 707/741 |
| 2013/0097309 A1 | 4/2013 | Ma et al. | |
| 2013/0227122 A1* | 8/2013 | Gao | H04N 21/8456 709/224 |
| 2014/0250219 A1 | 9/2014 | Hwang | |
| 2015/0026309 A1 | 1/2015 | Radcliffe et al. | |
| 2015/0039789 A1* | 2/2015 | Bisht | G06F 13/124 710/34 |
| 2016/0205164 A1* | 7/2016 | Schmidt | H04L 1/0001 709/219 |

OTHER PUBLICATIONS

Balan, et al., "Linux HTB Queuing Discipline Implementations", International Journal of Information Studies, vol. 2, No. 2 (2010), 2010.

Cisco, "Policing and Shaping Overview", http://www.cisco.com/c/en/us/td/docs/ios/12_2/qos/configuration/guide/fqos_c/qcfpolsh.pdf.

Ghobadi, et al., "Trickle: Rate Limiting YouTube Video Streaming", Proceedings of the 2012 USENIX Annual Technical Conference (USENIX ATC '12). USENIX Association, Berkeley, CA, USA, 17-17.

Nam, et al., "Towards a Dynamic QoS-aware Over-the-Top Video Streaming in LTE", A World of Wireless, Mobile and Multimedia Networks (WoWMoM), 2014 IEEE 15th International Symposium, pp. 1-9, Jun. 19, 2014, Jun. 2014.

EPO, "Extended European Search Report and Written Opinion", EPO Appl. No. 16882795.4, May 27, 2019.

* cited by examiner

FIG. 3

MAXIMIZING QUALITY OF SERVICE FOR QOS ADAPTIVE VIDEO STREAMING VIA DYNAMIC APPLICATION-LAYER THROUGHPUT RATE SHAPING

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems.

According to recent internet traffic studies, media streaming traffic (e.g., video streaming) makes up more than 50% of forward link bandwidth from servers to client devices. Further, the trend is moving upwards as more and more content providers start offering media (e.g., video) streaming services. For example, recent additions include HBO, CBS and other network and content provider streaming services. When a user watches or otherwise consumes a video, if the video is stored in a local storage device (e.g., a local cache) the streaming video content is provided directly from the local storage location. Alternatively, when the video content is not resident in a local storage device, the streaming content is provided over a wide area communications network or WAN (e.g., the Internet) from a remote content server. When the video is provided to the user or client device/application via adaptive video streaming, the user client device/application (e.g., a video player application running on a client personal computer or other media device) selects a playback rate and retrieves video segments of the respective playback rate from the content server via a request/response protocol. Further, such client playback devices/applications typically buffer a certain amount of content in order to provide the content from the local buffer at a consistent rate (thereby not having to rely on a consistent delivery rate over the WAN). Additionally, when the streaming content is provided from a remote content server over a WAN, there typically are several hops of communications links between the client device and the remote content server. Such communications links are shared by multiple users, where congestion levels over those links changes dynamically over time, and the bandwidth available to a particular user also changes dynamically over time. Moreover, if one or more of the communications links is via a radio transmission medium, such as cellular or satellite links, radio link conditions such as distance, weather and interference may also be dynamically changing, which imposes further impacts on available bandwidth. Accordingly, when any of the links over which the streaming content is being provided to the client device diminishes below certain levels, the selected playback rate may not be supported consistently during the video playback. As a result, the playback buffer may run out of video data and video playback may stop or become jittery or jumpy. The player may then have to select a lower rate and re-buffer the video content to resume a smooth consistent playback. When link condition fluctuates, the playback rate may also alternate between two rates. To solve such issues, traffic shaping and policing approaches are currently provided for media streaming applications.

Rate shaping is usually performed at the IP layer on a per IP flow basis. It is a mature technology supported by commercial networking devices and by the Linux operating system. Although rate shaping at IP layer can be configured for both forward and return directions, the shaped rate may be different from the targeted video playback rate, especially when round trip time (RTT) is one of the dominant factors, which determines the application layer throughput. Moreover, the rate shaping device is usually placed at ISP network and thus is too far away from the client playback device to accurately measure the RTT, especially when most contribution to the RTT is made by the last mile link to the client premises/devices. Furthermore, rate shaping at the IP layer may not be reactive in response to changing network conditions. As a result, it may drive the playback rate lower than it should be.

Rate shaping can be done at TCP layer per TCP flow for TCP applications. An upper bound can dynamically be set on sender's TCP congestion window to limit the rate, which is known as "congestion window clamp." Since it is set at TCP sender, the rate shaping device can be located at the content server or at a middle point between a player and a content server. To perform TCP congestion window clamps at a middle point, this approach can be performed only where a TCP proxy is deployed. A TCP proxy breaks one end-to-end TCP connection into two or three TCP connections with optimized TCP for each hop. TCP throughput is directly proportional to sender's congestion window and inversely proportional to RTT. TCP congestion window is set in terms of TCP Maximum Segment Size which is normally 1460 Bytes. At low RTT between the RSE and the player, this approach, however, offers only low granularity of control for rate shaping. The approach also does not take into account of the actual RTT between the player and the content server, which may be a major contributor to the application throughput.

For example, certain current networking equipment manufacturers include traffic shaping and policing processes in networking equipment (e.g., switches and routers). See, e.g., Cisco, "*Policing and Shaping Overview*," IOS QOS Solutions Configuration Guide, Rel. 12.2 www.cisco.com/c/en/us/td/docs/ios/12_2/qos/configuration/guide/fqos_c/qcfpolsh.pdf. Such approaches employ Internet Protocol (IP) layer per-flow or per-interface rate shaping by using token bucket mechanisms. Three basic parameters of such token bucket approaches are Committed Information Rate (CIR) which is mean shaped rate, Committed Burst size (BC) which is the amount of bytes that can be sent during a measurement time interval and a measurement time interval. Such approaches, however, do account for round trip time (RTT), do not provide application layer throughput shaping and are usually deployed inside the Internet Service Provider (ISP) network.

As a further example, the Linux operating system, by default, provides traffic control functions such as qdisc, filter and class, to perform rate shaping per traffic flow. See, e.g., Doru Gabriel Balan, Dan Alin Potorac, "*Extended Linux HTB Queuing Discipline Implementations*," First International Conference on Networked Digital Technologies, IEEE, Pages 122-126, 28 Jul. 2009. The Linux approach, however, also does not account for round trip time (RTT), and does not provide application layer rate shaping.

QoS-aware rate shaping was proposed to assist a client application player in selecting a proper resolution under fluctuating network conditions in the Long Term Evolution (LTE) network. See, e.g., Hyunwoo Nam, Kyung Hwa Kim, Bong Ho Kim, Doru Calin, Henning Schulzrinne, "*Towards dynamic QoS-aware over-the-top video streaming*," IEEE 15th International Symposium on a World of Wireless, Mobile and Multimedia Networks, Pages 1-9, 19 Jun. 2014.

With this approach, rate shaping sets a maximum allowable bandwidth on a per-flow basis at an eNodeB, which is located before the Last Mile inside the LTE network. This approach, however, approach does not consider round-trip time (RTT) between a client application (e.g., video player) and the content server, and does not shape the application layer throughput.

Rate limiting at a content server has been proposed to reduce queueing and packet loss for YouTube. See, e.g., Monia Ghobadi, Yuchung Cheng, Ankur Jain, Matt Mathis, "*Trickle: rate limiting YouTube video streaming*," USENIX Annual Technical Conference, USENIX Association, Berkeley, Calif., USA, Pages 191-196, 2012. In order to remove large bursts caused by existing application pacing mechanisms, the YouTube approach dynamically sets a maximum TCP sender congestion window and strictly limits the maximum size of the bursts. This approach, however, has such deficiencies as low granularity in rate controllability, and the rate shaping is employed remote from the client device/application and thus does not shape application layer throughput.

What is needed, therefore, is an approach for effectively and accurately performing application layer throughput shaping in adaptive video streaming to provide maximized Quality of Service (QoS) levels to the user client device/applications (e.g., video player).

SOME EXAMPLE EMBODIMENTS

The present invention advantageously addresses the foregoing requirements and needs, as well as others, by providing systems and methods that facilitate effective and accurate performance of application layer throughput shaping in adaptive video streaming to provide maximized Quality of Service (QoS) levels to the user client device/applications (e.g., video player).

A rate shaping element (RSE) may be employed to shape application throughput such that the player selects a playback rate which can be consistently maintained and the best consistent QoS can be provided for the user consumption/playback.

This invention presents a novel approach to effectively and accurately perform application layer throughput shaping in adaptive video streaming in order to provide best QoS to users. It can be employed in a system described in the invention disclosure [1] to serve the video at a particular bit rate which is stored in the cache. It can also be used to shape the video playback rate which can be maintained throughout the playback without rebuffering when the communication link between the client and the content server cannot provide the required bandwidth consistently when the video is not served from the cache but from the content server.

The invention proposes a Rate Shaping Element (RSE) which dynamically measures application layer throughput seen by a video player and estimates current playback rate of the player. The application layer throughput is not only determined by the bandwidth from a content server to a player (forward link bandwidth) but also by the bandwidth from a player to a content server (return link bandwidth) and by the round trip time (RTT) from the time a content request is sent to the time the response is received by the player. Application layer throughput is one of the key parameters used by adaptive video streaming player to select a particular video playback rate. The RSE proposed in this invention is located at the customer's premise. It shapes the application throughput so that the bit rate selected by the adaptive video streaming players matches either that of the video stored in the cache or the characteristics of communication links between the player and the content server when the video is not served from the cache but from the content server.

The RSE monitors transfers of HTTP requests for video segments from a player to a content server and HTTP responses with video segments from a content server to a player. It keeps a note of the following: the time when it receives a HTTP request from a player before forwarding to the content server, the time when it receives a corresponding HTTP response from the content server before forwarding to the client, and the content length of the video segment contained in the HTTP response. It then computes the HTTP throughput of a video segment. Moreover, it computes estimate of current playback rate of the player by using content length of segments and video segment duration. Based on the statistics of previous HTTP throughput measurements and configured video playback rate requirement, it makes a decision if playback rate adjustment is required or not. If the rate needs to be lower, it will add an appropriate delay before relaying the HTTP response to the player so that HTTP throughput seen by the player is appropriately reduced. Otherwise, the HTTP response will be sent to the player immediately.

The techniques is then extended to the case where adaptive video streaming is served over HTTPS.

In accordance with example embodiments, a method is provided for effective and accurate application layer throughput shaping in adaptive video streaming to provide maximized Quality of Service (QoS) levels to the user client device/applications. An application-layer throughput rate shaping device receives a content request message of a respective client device, the content request message requesting a current content segment of a sequence of content segments of a streaming data file for a streaming data session of the client device, and a time of receipt of the content request message is recorded, and the content request is forwarded to a remote content server. The application-layer throughput rate shaping device receives a content response message transmitted by the content server in response to the forwarded content request, the content response including the requested current content segment, and a time of receipt of the content response message is recorded, a content length is recorded, a segment size of the current segment is determined, and a current application-layer throughput (ALT) rate for the current segment is determined based on the time of receipt of the content request message, the time of receipt of the content response message and the segment size. The application-layer throughput rate shaping device determines whether the current ALT rate is greater than a target ALT rate required to support a desired playback rate (PBR) for the streaming data session of the client device. When it is determined that the current ALT rate is higher than the target ALT rate, the content response message is held for a holding time determined to lower the current ALT rate to the target ALT rate, and the content response is provided to the client device upon termination of the holding time. When it is determined that the current ALT rate is not higher than the target ALT rate, the content response is promptly provided to the client device.

According to a further example embodiment of the method, as part of the step of receiving the content response message, one of a measured and an estimated playback rate (PBR) associated with the current content segment of the streaming data session of the client device is determined. After the step of receiving the content response message, it is determined whether the measured or estimated PBR is higher than the desired PBR. When it is determined that the measured or estimated PBR is higher than the desired PBR, the method proceeds to the step of determining whether the current ALT rate is greater than the target ALT rate. When it is determined that the measured or estimated PBR is not higher than the desired PBR, the method further comprises promptly providing the content response to the client device, and the step of determining whether the current ALT rate is greater than the target ALT rate, along with the steps associated with the result of this determination, are not performed.

In accordance with further example embodiments, a device is provided for effective and accurate application layer throughput shaping in adaptive video streaming to provide maximized Quality of Service (QoS) levels to the user client device/applications. The device comprises a client device interface, a network communications terminal interface, and a rate-shaping element. The client device interface is operable to receive a content request message from a respective client device, the content request message requesting a current content segment of a sequence of content segments of a streaming data file for a streaming data session of the client device. The network communications terminal interface is operable to forward the content request to a remote content server, and to receive a content response message transmitted by the content server in response to the forwarded content request, the content response including the requested current content segment. The rate-shaping element is operable to record a time of receipt of the content request message, to record a time of receipt of the content response message, to record a content length and a segment size of the current segment, and to determine a current application-layer throughput (ALT) rate for the current segment based on the time of receipt of the content request message, the time of receipt of the content response message and the segment size. The rate shaping element is further operable to determine whether the current ALT rate is greater than a target ALT rate required to support a desired playback rate (PBR) for the streaming data session of the client device. When it is determined that the current ALT rate is higher than the target ALT rate, the rate shaping element is further operable to hold the content response message for a holding time determined to lower the current ALT rate to the target ALT rate and to release the content response upon termination of the holding time, and the client device interface is further operable to provide the content response to the client device once the response is released by the rate shaping element. When it is determined that the current ALT rate is not higher than the target ALT rate, the rate shaping element is further operable to promptly release the content response, and the client device interface is further operable to provide the content response to the client device once the response is released by the rate shaping element.

According to a further example embodiment of the device, the rate shaping element is further operable to determine one of a measured and an estimated playback rate (PBR) associated with the current content segment of the streaming data session of the client device. Whereby, before performing the determination whether the current ALT rate is greater than a target ALT rate, the rate shaping element is further operable to determine whether the measured or estimated PBR is higher than the desired PBR. When it is determined that the measured or estimated PBR is higher than the desired PBR, the rate shaping element is then operable proceed with the determination whether the current ALT rate is greater than a target ALT rate. When it is determined that the measured or estimated PBR is not higher than the desired PBR, the rate shaping element is further operable to promptly release the content response, and the client device interface is further operable to provide the content response to the client device once the response is released by the rate shaping element, and the rate shaping element is then operable to neither perform the determination whether the current ALT rate is greater than a target ALT rate, nor the functions associated with the result of that determination.

Such embodiments of the present invention facilitate the dynamic shaping of the application throughput in an effective and accurate manner so that the video playback rate selected by the adaptive video streaming player matches either that of the video stored in the cache or the characteristics of communication links between the player and the content server when the video is not served from the cache but from the content server. Such embodiments of the present invention further facilitate transparent operations without requiring any modification to content servers, players and the protocol used between them.

According to the approaches of example embodiments, control the client playback device to choose a playback rate required to provide the best QoE (Quality of Experience) to a user with the following properties: (1) the rate shaping element is located close to the respective client playback device(s), thereby providing for a more accurate estimate of application layer throughput as seen by the playback device(s); (2) the rate is shaped at the application layer, which provides the most direct impact on the desired rate adaptation decisions of the playback device(s); (3) the shaping is performed per application session, and not on a per flow basis; and (4) the application layer throughput is continuously measured and shaped to provide dynamic responses to changes in link conditions, and to not over-shape to a lower playback rate.

Further, application layer throughput in adaptive video streaming, according to example embodiments, can be significantly different from IP layer throughput since it depends on the following factors: (1) Round Trip Delay (RTT) between a player and a content server; (2) Adaptive video streaming application makes use of request/response protocol (HTTP) to fetch each video/audio segments; (3) TCP throughput also depends on RTT; (4) Rate decreases as RTT increases; (5) Return link bandwidth (Return link is a communication link from a player to a content server); (6) Forward link bandwidth (Forward link is a communication link from a content server to a player); (7) TCP parameters such as Window size and Maximum Segment Size (MSS); (8) Interaction between TCP/IP packet dropping and delay and TCP congestion control algorithm. IP layer rate shaping can control forward link and return link bandwidth only.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which:

FIG. 3 illustrates the video segments of a plurality of different presentation or playback bit rate (PBR) video and audio files, in accordance with example embodiments;

DETAILED DESCRIPTION

Systems and methods that facilitate effective and accurate performance of application layer throughput shaping in adaptive video streaming to provide maximized Quality of Service (QoS) levels to the user client device/applications (e.g., video player), are provided. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Rate shaping for adaptive video streaming is different from rate shaping in general since adaptive video streaming application operates in a unique way. An adaptive video streaming player selects a playback rate based on application layer throughput which depends on a round trip time between a player and a content sever and return link bandwidth in addition to forward link bandwidth. Further, there is a well-defined discrete set of playback rates available for a player to select in adaptive video streaming, and the rate adaptation is dynamic: the player continuously measures the application layer throughput to dynamically adjust the playback rate. Rate shaping without consideration of the above facts may unnecessarily drive a player to select a lower rate.

There are two main design factors in rate shaping for adaptive video streaming: the location of the rate shaping element functions within the internet protocol stack and the physical location of the rate shaping element (RSE). For example, the RSE rate shaping can be performed at different layers of the internet protocol stack: IP, TCP and application layers. Further, the RSE can be located at various network locations, such as at the content server, inside an Internet Service Provider (ISP) network, and within the customer premise network. The RSE at the customer premise network provides the most accurate location for determining and controlling application layer throughput as seen by a the client playback device. The application layer throughput is determined by the First Mile (content provider to ISP), the Middle Mile (ISP network) and the Last Mile (ISP to customer's premise) altogether.

Figure 1:
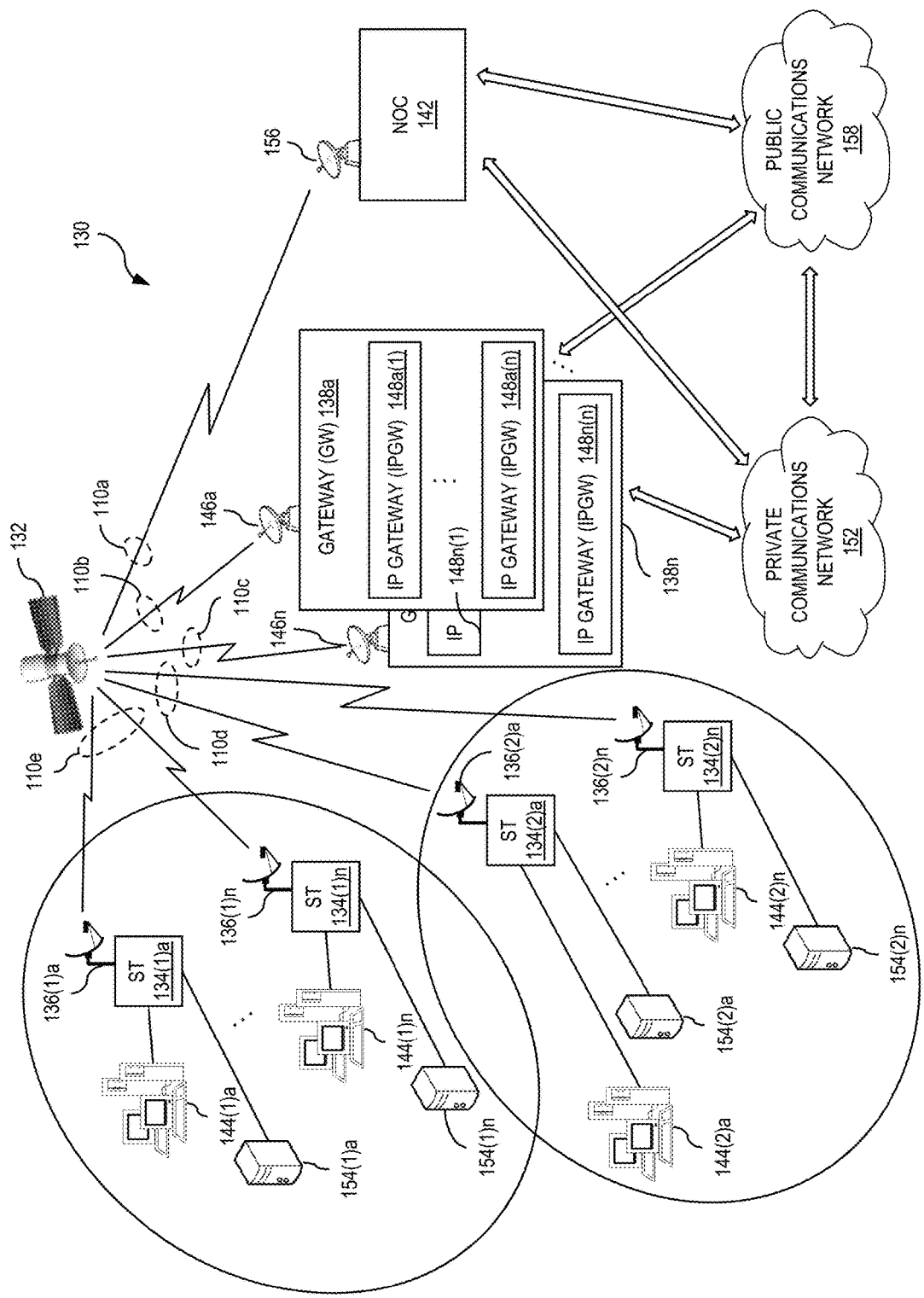
FIG. 1 illustrates a block diagram of a satellite communications system for providing adaptive streaming media services, in accordance with example embodiments.

FIG. 1 illustrates a block diagram of a satellite communications system for providing adaptive streaming media services, in accordance with example embodiments of the present invention. Satellite communications system 130 includes a satellite 132 that supports communications among multiple satellite terminals (STs) 134(1)*a*-134(1)*n* and 134(2)*a*-134(2)*n*, a number of gateways (GWs) 138*a*-138*n*, and a network operations center (NOC) 142. The STs, GWs and NOC transmit and receive signals via the antennas 136(1)*a*-136(1)*n* and 136(2)*a*-136(2)*n*, 146*a*-146*n*, and 156, respectively. According to different embodiments, the NOC 142 may reside at a separate site reachable via a separate satellite channel or may reside within a GW site, and alternatively the NOC 142 may comprise a distributed system that is distributed amongst a plurality of sites for purposes of distributed processing, scalability, etc. Further, as depicted, in a spot beam system, the satellite communicates with the various ground infrastructure (the STs, GWs and NOC) via a plurality of uplink and downlink spot beams 110*a*, 110*b*, 110*c*, 110*d*, 110*e*. By way of example, the NOC and each GW may each be serviced by a dedicated uplink and downlink spot beam pair, and the groups of STs (e.g., the group of STs 134(1)*a*-134(2)*n* and the group of STs 134(2)*a*-134(2)*n*) may each be serviced by a dedicated uplink and downlink spot beam pair as a group—a shared bandwidth architecture, where the STs share the respective uplink and downlink bandwidth of a spot beam amongst them. Each uplink beam and downlink beam covers a respective geographic area on the Earth that is shaped according to the respective antenna designs of the uplink and downlink antennae of the satellite. Further, the uplink beam of a particular coverage area need not be contiguous with a respective downlink beam of that area—but rather, for example, the coverage area of a particular uplink beam may be broken up and covered by multiple downlink spot beams. Additionally, the uplink and downlink spot beams may also be streerable for dynamic adjustment of capacity plans based on a geographic capacity demand distribution that changes over time.

The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively.

By way of example, the Satellite communications system 130 may operate as a bent-pipe system, where the satellite essentially operates as a repeater or bent pipe. In a bent-pipe system of an example embodiment, the satellite 132 operates as a repeater or bent pipe, whereby communications to and from the STs 134a-134n are transmitted over the satellite 132 to and from respective IPGWs associated with particular STs. Further, in a spot beam system, any one spot beam operates as a bent-pipe to a geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). For example, content (e.g., streaming video content, such as a streaming movie) originating from a content server (not shown) may be provided to the GW 138a and the IPGW 148a(1). Then (via a broadcast beam or spot beam of the satellite 132) the content may subsequently be broadcast by the gateway 138a to the terminals 134a-134n within a respective broadcast beam of the satellite, or multicast to a subset of the terminals 134a-134n via a spot beam of the satellite. Further, while the content may be directed to one or more specific terminals (e.g., that requested the content), other terminals within the reception beam may opportunistically cache the content for the event that users of one or more of the other terminals subsequently request the content.

Figure 2:
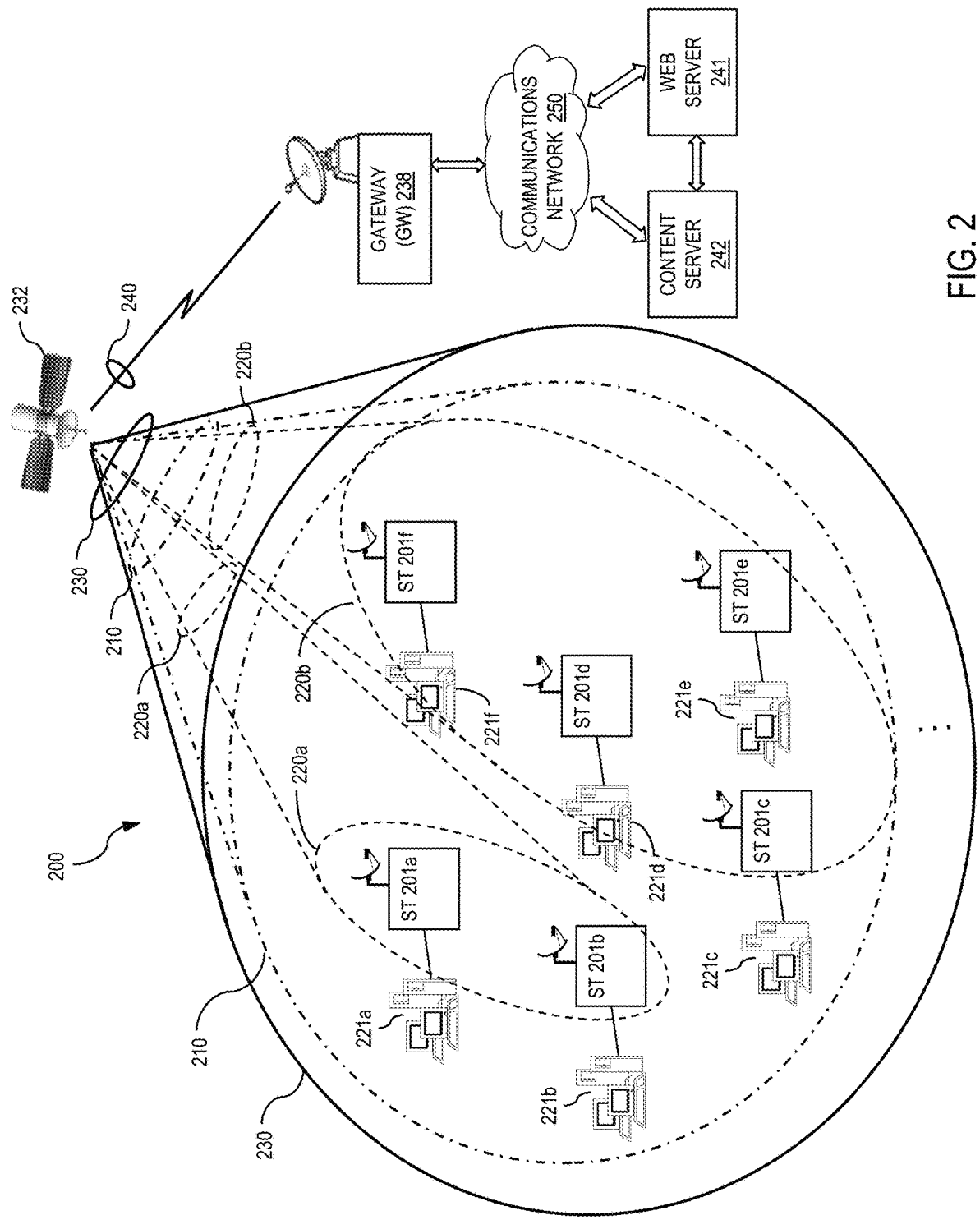
FIG. 2 illustrates a block diagram of a further satellite communications system for providing adaptive streaming media services, in accordance with example embodiments.

FIG. 2 illustrates a block diagram of a further satellite communications system for providing adaptive streaming media services, in accordance with example embodiments of the present invention. The system 200 comprises a satellite 232, a number of satellite client/user terminals ST201a, ST201b, ST201c, ST201d, ST201e, ST201f, . . . , a gateway 238, a communications network 250 (such as the Internet) and a web server 241, and a content server 242. By way of example, the web server 241 may be an enterprise web server, such as a Netflix Internet host server or an Apple Internet host server. By way of further example, the content server may be a general content server accessible directly over the Internet, or a specific enterprise content server, such as a Netflix content server utilized for storage of Netflix content and accessible via a Netflix Internet host server. As would be apparent to one of skill in the art, the communications system 200 need not be limited to just one gateway, one communications network, one web server, and one content server. For example, as depicted in FIG. 1, a number of gateways and IP gateways may respectively serve groups of the universe of terminals in the system. Further, content may be provided to the one or more gateways, via the communications network, from a multitude of web servers and content servers (with one or more content servers being provided by each of a number of content providers). Also, content from different content providers may be provided over different delivery networks—for example, a large corporate network may provide content to a multitude of corporate sites and corporate user terminals via the Internet (e.g., over a VPN) and/or a private corporate wide area network (WAN). Moreover, it would also be apparent to one of skill in the art that the system need not be limited to any specific maximum number of satellite terminals 201—the number of terminals would be governed by associated system design factors, such as satellite capacity, number of satellite beams, the number of gateways and IP gateways, the capacity management and terminal/client management systems of the network, etc. Further, as described above, with respect to uplink and downlink beams of the satellite, FIG. 2 depicts an uplink beam 210 and two downlink beams 220a and 220b. The STs 201a-201f are all serviced by the one uplink beam 210, while the STs 201a-201b are serviced by the downlink beam 220a and the STs 201c-201f are serviced by the downlink beam 220b. The satellite 232 further provides a broadcast capability via the downlink beam 230, which would cover a relatively large geographic area (e.g., the continental United State) containing multiple individual uplink and downlink beams over that coverage area.

Further, as depicted, in such a broadband communications system, comprising one or more satellite gateways, one or more satellites, and a plurality of client/user satellite terminals, the gateways communicate with content servers (e.g., web and application servers) via the communications network 250 (e.g., the Internet), and the client terminals transmit requests to and receive content responses from the gateways via channels or beams of the satellite. As used herein, a forward link refers to a communications path or channel from a gateway to the terminals, and a return link refers to a communications path or channel from a terminal to a gateway. Generally, all terminals within the coverage area of a forward link satellite beam can receive the data transmitted by a gateway over that forward link. Content is generally delivered from a content server to a client device via a request/response protocol. By way of example, Hypertext Transfer Protocol (HTTP) is a common example of such a request/response protocol. When a client wants to consume content, the client issues a content request to a content server. The request is received by the satellite terminal and the terminal transmits the request to the gateway that services the terminal via the respective return link channel. The gateway then relays the request to the content server. When the content receives the content request, it acquires or retrieves the content and streams the content back to the gateway via the communications network. The gateway then relays the content response to the requesting terminal/client via the forward link channel. In the event that the gateway content response broadcast by the gateway can be received by all the terminals in the satellite beam. The terminal then provides the content response to the client. During content delivery, both content requests and content responses go through the gateway and the terminal between a client and a content server.

By way of example, a user of a particular client terminal (e.g., the client terminal 221a) may request a specific content file, for example, a movie file via the user's Netflix account. As a result, the web browser client application of the terminal 221a would forward the request, addressed to the Netflix host server (e.g., the web server 241), to the ST 201a. The ST 201a first makes a determination of whether the requested content is already stored in its local cache, and if so, the ST provides the content to the respective client terminal directly from its cash. If the content is not a restored in the local cache of the ST 201a, the ST repackages or encapsulates the request with a source address of the ST 201a and a destination address of the respective gateway servicing the ST (e.g., the gateway 238), while maintaining the original source address of the client terminal and destination address of the web server within the encapsulated packet, and transmits the message over the satellite 232 to the gateway 238. The gateway receives the transmitted message, de-encapsulates it to obtain the originally intended destination address (that of the web server 241—in this case the Netflix Internet host server), re-encapsulates the request with a source address of the gateway 238 and a destination address of the web server 241 (while still maintaining the original source address of the client terminal and destination address of the web server within the encapsulated packet), and transmits the message over the communications network 250 to the web server. In response, the web server retrieves the movie content from the content server 242, and streams the content, via the communications network 250, to the gateway 238 (which was indicated to the web server as the immediate source of the request message). For example, the web server encapsulates the streamed content data with the web server as the immediate source address and the gateway as the immediate destination address, while including the web server as the original source address and the client terminal 221a as the ultimate destination address with the encapsulated data packets, and transmits the packets to the gateway 238 via the communications network 250. Alternatively, the web server may control the content server 242 to process and transmit the content data directly to the gateway via the communications network 250.

The gateway de-encapsulates the packets to obtain the intended destination address (that of the client terminal 221a) and resolves that address as being handled by the ST 201a, re-encapsulates the packets with a source address of the gateway 238 and a destination address of the ST 201a (while maintaining the original source address of the web server 241 and destination address of the client terminal 221a within the encapsulated packet), and transmits the packets to the satellite 232. Upon receiving the packets, the respective satellite transponder transmits the packets via the corresponding downlink beam/channel 220a for receipt by the ST 201a. The ST 201a receives the content data packets, de-encapsulates the packets to determine the appropriate address resolution and resolves the destination address as the client terminal 221a, and forwards the packets to the destination terminal. As would be recognized by one of skill in the art, such a system according to example embodiments would not be limited to any specific communications protocols, but rather may employ any of various different known communications formats or protocols for the exchange of the messaging and content over the various links of the network. For example, at the Internet layer, the standardized Internet Protocol (IP) may be applied for relaying datagrams across the network boundaries, by delivering packets from the source host to the destination host solely based on the IP addresses in the packet headers. Further, at the transport layer, any one of a number of known protocols may be employed, including Transmission Control Protocol (TCP), User Datagram Protocol (UDP), etc. Similarly, various well known protocols may be applied at the application and link layers.

Video and audio content is encoded into different formats such as VC-1, H.264, HEVC, WMA, ACC, DD, etc. For each encoding scheme, a single video content file will be encoded into several different files, each corresponding to different resolutions at different respective bit rates. For example, the different encoded video content files may range from 235 kbps to 16 Mbps and beyond. Generally, for a particular content video file, there will be several video files with different bit rates for each video encoding format and a couple of audio files of different bit rates for each different audio encoding formats. Typically, there will be about eight video files with different bit rate for each encoding scheme and a couple of audio files for different encoding scheme. Encoded video and audio files generally are also protected by digital rights management (DRM) schemes resulting in different DRM formats such as WMDRM, PlayReady, Widevine, etc. Further, each video and audio file is either virtually or physically divided into segments of some duration. By way of example, the segment duration may range from a couple of seconds to tens of seconds each segment. There are several segmentation techniques such as muxed ASF, unmuxed ASF, muxed M2TS, unmuxed M2TS, unmuxed FMP4, etc. Segmentation and packaging into different formats is also known as formatting into different "containers." The combination of video and audio encoding schemes, DRM methods and type of containers is known as a profile. A video is generally processed into several profiles and profiles are created to serve different platforms such as iDevice, Android, Roku, Xbox, PlayStation, etc. For further security, a common single encryption key is generally used for encrypting a video/audio file, and the key is typically the same for all users. The key is encrypted with a session key and is delivered to different users. As a result, video/audio files at a particular bit rate from a profile are identical for all the users. In practical applications, several video streaming services employ the foregoing approach of encoding and segmenting audio and video content files.

Figure 3:
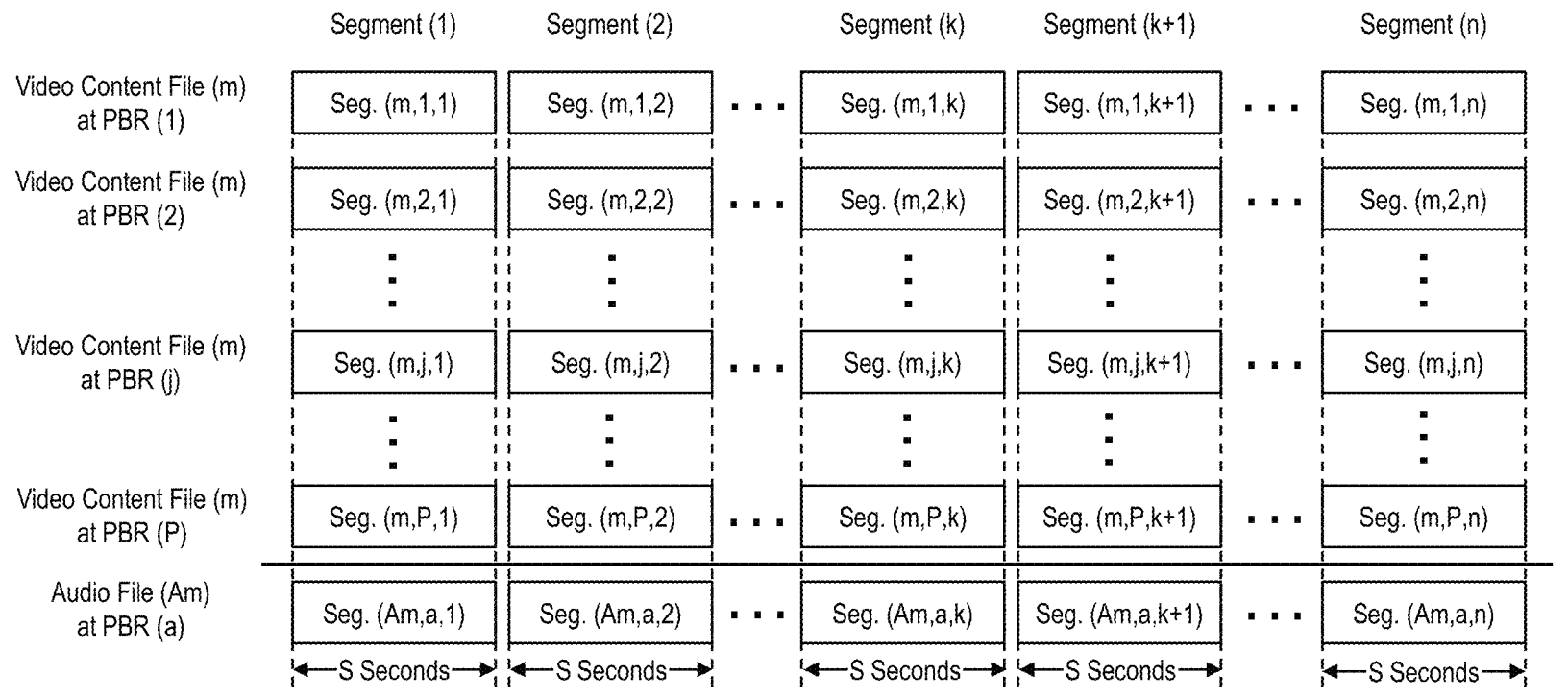

FIG. 3 illustrates the video segments of a plurality of "P" different presentation or playback bit rate (PBR) files (PBR (1), PBR (2), . . . , PBR (j), . . . , PBR (P)), and an audio file "Am" of a PBR (a), for a particular profile of the video content file (m), in accordance with example embodiments of the present invention. A profile is determined by a combination of the video encoding scheme, audio encoding scheme, digital rights management (DRM) scheme and container format. In the example of FIG. 3, the video content file (m) comprises "P" video files (each of a different respective bit rate or PBR) and one audio file. Each video file and the audio file is composed of "n" segments, each of "S" seconds in duration. The nomenclature Seg. (x,y,z) represents the $z^{th}$ video segment of the video file of bit rate "y" of the video content file "x". For example, the segment Seg. (m,1,1) represents the first segment of the video file of PBR (1) of the video content file (m), Seg. (m,1,k) represents the $k^{th}$ segment of the video file of PBR (1) of the video content file (m), and so on. Similarly, the segment Seg. (m,j,1) represents the first segment of the video file of PBR (j) of the video content file (m), Seg. (m,j,k) represents the $k^{th}$ segment of the video file of PBR (j) of the video content file (m), and so on. Further, the segment Seg. (Am,1,1) represents the first segment of the audio file "Am" at PBR (a) for the video file (m), Seg. (am,1,k) represents the $k^{th}$ segment of the audio file at PBR (a) for the video file (m), and so on. Generally, in practice, for presentation or playback of a particular video content file, only a subset of the respective video segments is downloaded by the client device/application since not all of the segments are required for a playback.

Figure 4:
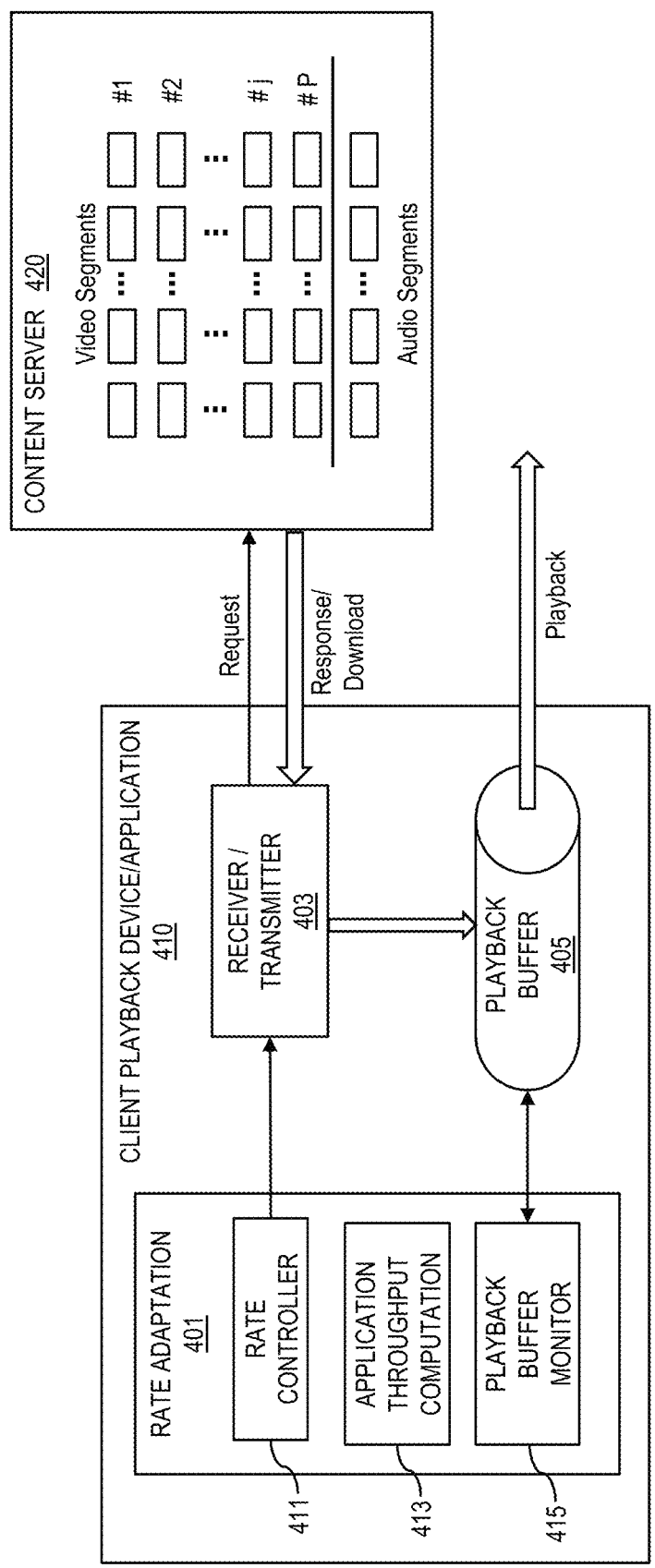
FIG. 4 illustrates a block diagram of a client playback device/application, which employs rate adaptation, in an adaptive media streaming system, in accordance with example embodiments.
Figure 5:
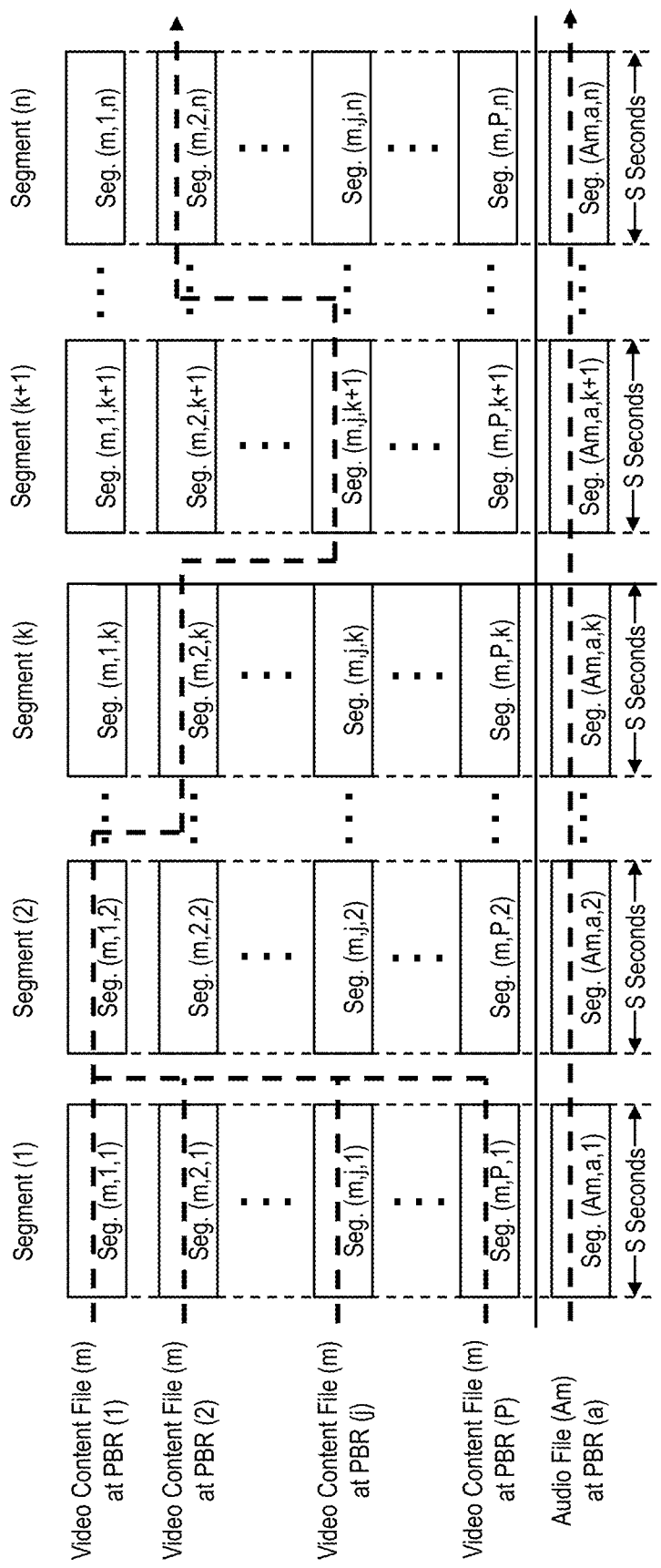
FIG. 5 illustrates a sequence of video segments downloaded by the client playback device/application of FIG. 4, for a video playback session employing adaptive video streaming, in accordance with example embodiments.

FIG. 4 illustrates a block diagram of a client playback device/application, which employs rate adaptation, in an adaptive media streaming system, in accordance with example embodiments of the present invention. FIG. 5 illustrates a sequence of video segments downloaded by the client playback device/application of FIG. 4, for a video playback session employing adaptive video streaming, where the dashed line reflects the download sequence, in accordance with example embodiments of the present invention. The client playback device/application 410 comprises a rate adaptation element 401, a receiver/transmitter 403, and a playback buffer 405. The rate adaptation element 401 comprises a rate controller 411, an application throughput computation unit 413, and a playback buffer monitor 415. The download sequence of the segments depends on the interaction between the playback device/application rate adaptation algorithm and the status of the various links of the download path through the network (e.g., link congestion and link margin or throughput rate—such as link margin or throughput rate of a satellite communications link based on weather conditions). Also, the download sequence or pattern may not be predictable as a user may arbitrarily stop, restart, forward and/or reverse playback at any time. The video streaming usually starts with control signaling between the playback device/application 410 and the control servers of the content provider (e.g., the content server 420 of FIG. 4). By way of example, an adaptive video streaming session may employ HTTP and HTTPS protocols, such as HTTPS for control signaling and HTTP for the video and audio download. Alternatively, HTTPS may also be used for video and audio download. Such control signaling may include various request and response signaling (e.g., HTTP GET request and associated response messaging) and handshaking transmissions (e.g., TCP/IP handshaking) to establish the session and identify the desired video content file, and other control functions, such as security access and user authorization controls. Once the control signaling has been completed, the video and audio download begins and the playback device/application begins the buffering of the video and audio segments and the playback of the video content file.

With further reference to FIG. 4 and FIG. 5, as an example, playback device/application 410 typically downloads the first segments from each of the PBR video files and audio file(s) (as indicated by the dashed line through the first segment of each of the PBR video files of FIG. 5). The rate controller 411 then typically starts at the lowest bit rate, controlling the transmitter/receiver 403 to request further segments from the video file of the lowest PBR (as indicated by the dashed line through the second segment [Seg. (m,1, 2)] of the PBR (1) video file of FIG. 5). The rate adaptation algorithm 401 continuously measures or estimates the available bandwidth and monitors its playback buffer status, via the application throughput computation element 413 and the playback buffer monitor 415, respectively. For example, application throughput can be computed for each downloaded segment by dividing the segment size by the respective download time, and available bandwidth can be estimated from application throughput statistics. The rate adaptation algorithm 401 will then determine whether a higher PBR can be sustained based on the bandwidth estimation and playback buffer status. In the event that the determination is positive, the rate adaptation algorithm will control the transmitter/receiver 403 to begin downloading further segments from the higher PBR video file and switch to the higher playback rate (as indicated by the dashed line through the $k^{th}$ segment [Seg. (m,2,k)] of the PBR (2) video file of FIG. 5). Generally, after an initial startup, when the network condition between the user client and the content server is stable, the playback usually stabilizes at a highest sustainable bit rate and stays there until the end of the video (as indicated by the dashed line through the $(k+1)^{th}$ segment [Seg. (m,j,k+1)] of the PBR (j) video file of FIG. 5). Even though apparently stable, the rate adaptation algorithm 401 may continue to measure/estimate the available bandwidth and monitor playback buffer status. Accordingly, if network conditions diminish during playback, the rate adaptation algorithm may detect a reduction of available bandwidth and a resulting continued reduction of buffered video segments. In this instance, the rate adaptation algorithm may determine that the current PBR can no longer be sustained, and will accordingly control the transmitter/receiver 403 to begin downloading further segments from the lower PBR video file and switch to the lower playback rate (as indicated by the dashed line through the n$^{th}$ segment [Seg. (m,2,n)] of the PBR (2) video file of FIG. 5).

Figure 6:
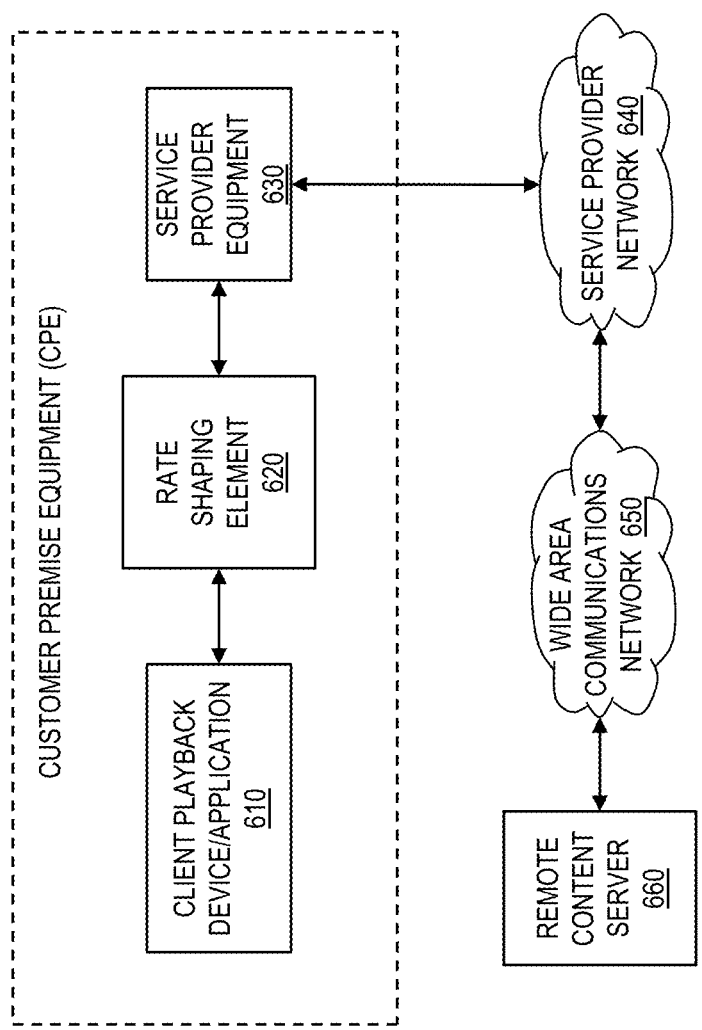
FIG. 6 illustrates an adaptive media streaming system that employs a Rate Shaping Element (RSE), in accordance with example embodiments.

FIG. 6 illustrates an adaptive media streaming system that employs a Rate Shaping Element (RSE), in accordance with example embodiments of the present invention. As depicted in the figure, the local user/client equipment (the customer premise equipment (CPE)), located locally within the client customer's premises, includes the client playback device/application (which may be the same or different than the client playback device/application 410 of FIG. 4), a rate shaping element (RSE) 620, and the local service provider equipment 630, as required for the provision of communications services subscribed to or purchased by the client user or customer, and provided by a service provider via the service provider network 640. Such service provider equipment may include modems and routers, such as DSL and/or cable modems, fiber optical nodes or modems for fiber-optic communications, and/or satellite terminals for satellite communications services. Utilizing the subscribed services of the service provider network 640, the customer or client may, in turn, access various data and applications sources, for example, over a wide area communications network 650 (such as the Internet). Further, such data and applications sources may include data streaming (such as media streaming) services via a remote content server 660.

Figure 7:
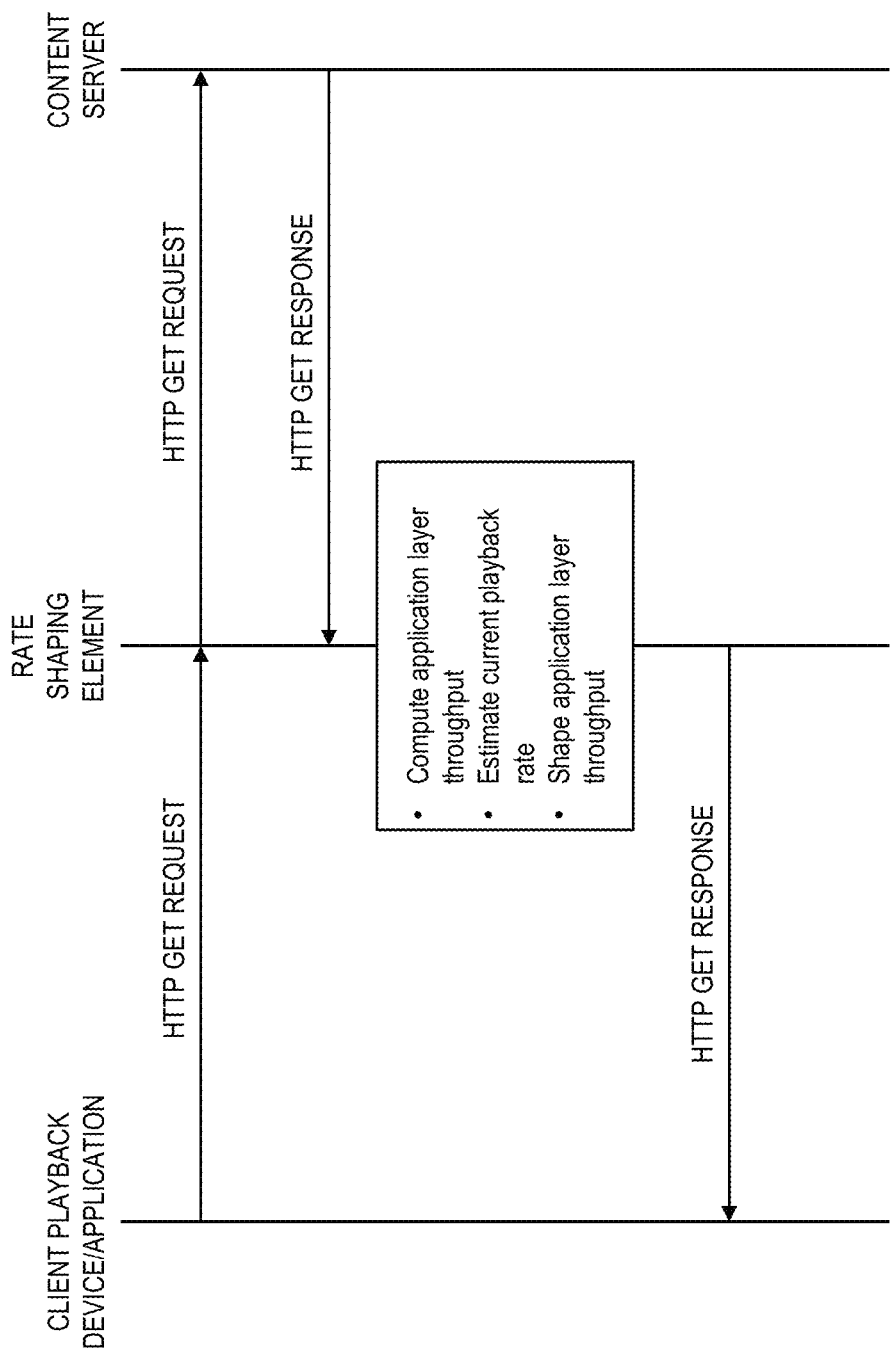
FIG. 7 illustrates the general signaling of an adaptive data or media streaming system, and the application layer rate shaping process of the RSE, in accordance with example embodiments.

FIG. 7 illustrates the general signaling of an adaptive data or media streaming system, and the application layer rate shaping process of the RSE, in accordance with example embodiments of the present invention. In the context of an HTTP video streaming application, the client playback device/application issues an HTTP GET request for the desired media/video content. The RSE forwards the HTTP GET request on to the respective content server. In response to the GET request, the content server responds with an HTTP GET response message. The RSE receives the response message, and, in accordance with example embodiments, the RSE performs certain functions relating to the data streaming (e.g., video streaming) service, including (1) dynamic measurement of application layer throughput, (2) dynamic estimation of current playback rate of the respective client playback device/application 610, and (3) dynamic shaping of the application layer throughput seen by the client playback device/application, in order to control the client playback device/application to select a desired playback rate. In that regard, the RSE is placed at a vantage point as close as to the client playback device/application as reasonably practical in order that the RSE is able to accurately approximate the application layer throughput as seen by the client playback device/application. The RSE then forwards the HTTP GET response to the client playback device/application, where the RSE may hold the HTTP response to increase the round-trip time experienced by the playback device/application in the event that the RSE determines that the application layer throughput needs to be lowered to achieve the desired playback rate. As would be apparent to one of skill in the art, the RSE may operate as a proxy device between the client playback device/application and the content server, and accordingly may encapsulate or re-encapsulate the respective messages with the appropriate source and destination IP addresses in order that the rate shaping element receives the response messages via its own IP address and is able to match the source IP address (e.g., the address of the respective content server) with the appropriate IP address for the client playback device/application. Alternatively, the RSE may operate as a pass-through entity utilizing the IP address of the client playback device/application as its own IP address for communications with the ultimate remote content server.

Figure 8:
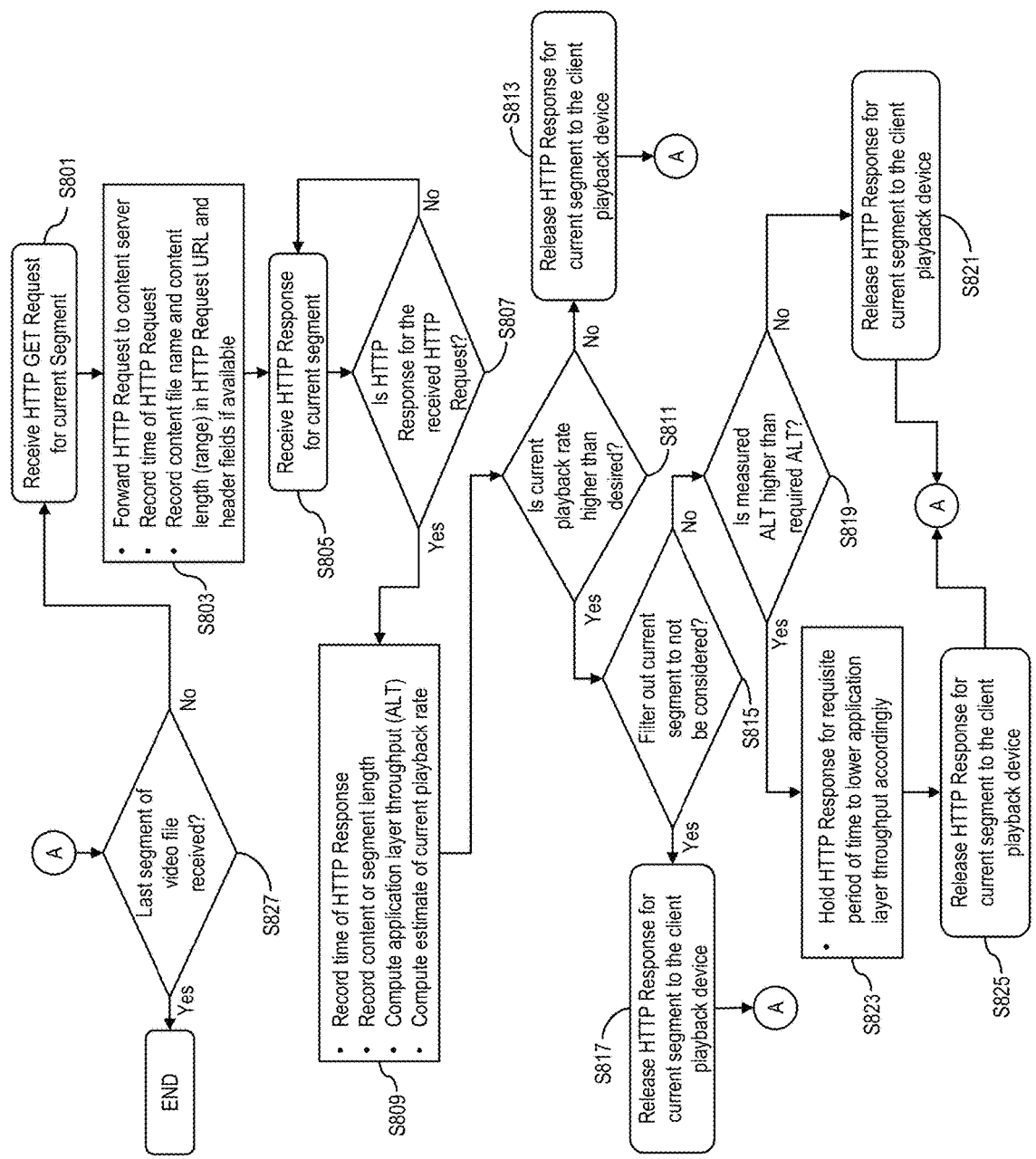
FIG. 8 illustrates a flow chart depicting an application layer shaping algorithm performed by the RSE, in accordance with example embodiments.

FIG. 8 illustrates a flowchart depicting an application layer shaping algorithm performed by the RSE, in accordance with example embodiments of the present invention. In a first step, the RSE receives an HTTP request, from a client playback device/application, for a current video segment of a video file (S801). Once the HTTP request is received, the RSE forwards the request to the content server 660 (e.g., via the service provider equipment 630, service provider network 640 and WAN 650), records the time of receipt of the request, and obtains the video file name and content length from the HTTP request URL and header fields (S803). The RSE then waits to for an HTTP response from the content server corresponding to the HTTP request for the current video segment. Once the RSE receives an HTTP response (S805) it confirms that the received HTTP response corresponds to the HTTP request for the current segment (S807). If, for some reason, the HTTP response does not correspond to the HTTP request, the RSE continues to wait to receive the corresponding HTTP response. Once the corresponding HTTP response is confirmed, the RSE records the time of receipt of the response, which is determined as the time of receipt of the last packet of the response (S809). The RSE obtains the video content length from the HTTP response header field and/or size of the HTTP response body itself (S809). The RSE further computes the application layer throughput (ALT), and computes an estimate of the current playback rate (S809). The RSE then determines whether the current playback rate is lower than or equal to the desired playback rate (S811). In the event that the RSE determines that the current playback rate is lower than or equal to the desired playback rate, it promptly relays or forwards the HTTP response for the current segment to the client playback device for buffering and playback (S813).

Alternatively, in the event that the RSE determines that the current playback rate is higher than the desired playback rate, the RSE determines that the playback rate should be lowered. According to one embodiment, the RSE controls the client playback device to lower the playback rate by lowering the ALT. When the ALT is lowered by a requisite amount, the client playback device/application will determine that the current throughput rate is not sufficient to sustain the playback rate, and responds by lowering the playback rate to the desired rate (which would be supported by the ALT, as lowered by the RSE). By way of example, upon determining that the playback rate should be lowered, the RSE first performs an optional step of determining whether the current segment should be filtered out so as not to be considered for the ALT (S815). The RSE may determine to exclude some segments from consideration when the segment size is significantly smaller than an average segment size for the playback rate. In the event that the RSE performs the optional step, and determines that the current segment should be filtered out, it releases the HTTP response for the current segment to the client playback device for buffering and playback (S817). Alternatively, in the event that the RSE performs the optional step and determines that the current segment is to be considered, the RSE determines whether the corresponding measured ALT is higher than the required ALT for the desired playback rate (S819). In the event that the RSE determines that the measured ALT is lower than or equal to the required ALT, it releases the HTTP response for the current segment to the client playback device for buffering and playback (S821). Alternatively, in the event that the RSE determines that the measured ALT is higher than the required ALT, it holds the respective HTTP response for a requisite period of time to lower the application layer throughput to a level corresponding to the desired playback rate (S823). Once the requisite period of time is reached, the RSE releases the HTTP response for the current segment to the client playback device for buffering and playback (S825). After any of the steps where the RSE releases the HTTP response for the current segment to the client playback device (Steps, S813, S817, S821, S825), the RSE then determines whether the last segment of the video file has been received—if no, then the RSE waits for the HTTP GET request for the next video file segment (S810) and the process continues for the subsequent video file segments, and, if yes, then the playback process ends.

More specifically, the application layer shaping algorithm of such embodiments operates based on certain parameters or variables. By way of example, the algorithm operates based on certain parameters, including a set of playback rates of the client playback device/application—for purposes hereof, the set of playback rates will be denoted as {PBR(i), i=1, 2, ..., P}, where PBR(i) reflects the average playback rate i, P reflects the total number of playback rates in the set, and PBR(i)<PBR(i+1), where i=1, 2, ...,P−1. An example set of playback rates may be {0.235, 0.375, 0.56, 0.75, 1.05, 1.75, 2.35, 3.0} in mega-bits-per-second (Mbps). Additionally, such parameters may include a segment size (in seconds) for each of the playback rates, where the segment size would be provided by the specifications for the respective playback rate of the client playback device/application. By way of further example, the algorithm operates based on certain configurable parameters, including a desired playback rate for each video content file and playback session—for purposes hereof, each such playback rate will be denoted as $PBR_{Desired}$. Additionally, such configurable parameters may include a headroom for the required application layer throughput to support a specific playback rate percentage (a percentage buffer above the playback rate as a playback rate is an average value). For example, for an application layer throughput level, $ALT_{Required}$, required to support a specific desired playback rate, $PBR_{Desired}$, and a headroom of 40%, $ALT_{Required} = 1.4 * PBR_{Desired}$. PBR is an average rate, where an instantaneous playback rate can be significantly higher than the average rate. The ALT required to support a specific desired playback rate, therefore, should have significant headroom in order to accommodate instantaneous rate fluctuations and prevent rebuffering at the playback device. As a corollary, the headroom cannot be so large as to drive the PBR to the next higher playback rate.

With regard to the estimation of the playback rate performed as part of the application layer shaping algorithm, while the RSE receives audio/video segments, it may not actually know whether a segment belongs to audio or video or the particular playback rate video file that a segment belongs to. According to example embodiments, however, the RSE may accurately estimate the current playback rate of a playback device/application based on certain metadata information that may be available in the HTTP request URL and header fields. By way of example, an ephemeral identifiable character string or video file ID, which represents a particular video/audio file corresponding to a respective playback rate, may be present—for purposes hereof the video file ID will be denoted as "VideoFileID(i)," where i=1, 2, ..., P. Further, an ephemeral identifiable character string or video ID, which represents a particular video content or title, may be present—for purposes hereof the video ID will be denoted as "VideoID." In some cases, content providers attempt to intentionally obscure the VideoFileID and VideoID for security purposes to prevent video pirating or theft, and may also change the parameters from session to session (even for a common client device). In such cases, however, the RSE may still use the VideoFileID and VideoID parameters, as these parameters are ephemeral in nature and remain constant for all segments within a playback session. In other words, within a particular session, the VideoFileID and VideoID parameters can be utilized to identify the video content title and respective PBR file as they remain constant for all segments of the session. According to one embodiment, therefore, the video segments of a particular video content file or title can be identified by the VideoID parameter, and the segments belonging to a common video content title can be classified into file groups based on the VideoFileID parameter, where each group corresponds to a video file of a respective PBR. Then, because all segments of a common PBR video file in an adaptive media or video streaming system are of the same duration, the measured PBR per segment in each file group can be computed as follows:

$$PBR_{Measured} = \frac{\text{Segment Size}}{S}$$

where $PBR_{Measured}$ is the measured playback rate for a segment and S is the duration of the segment in seconds. Further, an accurate estimate of the PBR ($PBR_{Estimate}$) for a particular video file group may be determined as the statistical average of the measured PBR values ($PBR_{Measured}$) for the received segments of the video file group.

With regard to the measurement of the Application Layer Throughput ($ALT_{Measured}$) for a video segment, performed as part of the application layer shaping algorithm, according to one embodiment, the measured ALT may be computed as follows:

$$ALT_{Measured} = \frac{\text{Segment Size}}{RTT_{Measured}}$$

where $RTT_{Measured}$ is the round-trip-time (RTT) for the segment, measured from the time at which the RSE receives an HTTP GET request for a current segment to the time at which the RSE receives the last packet of the corresponding HTTP response. RTT is composed of the return link delay plus the forward link delay. The return link delay is the delay from the time that the RSE receives the HTTP GET request for the current segment and sends the HTTP request on to the respective content server to the time that the HTTP request is received by the content server. The forward link delay is the delay from the time the corresponding HTTP response is sent by the content server to the time that the corresponding HTTP response is received by the RSE.

In other words, the return and forward link delay consists of the request propagation delay from the RSE to the content server and the response propagation delay from the content server to the RSE, the transmission delay of the request from the RSE to the content server and the transmission delay of the response from the content server to the RSE, and any queuing delays of the request over the links of the path from the RSE to the content server and of the response over the links of the path from the content server to the RSE. When propagation and queuing delay are small, ALT is determined by the transmission delay (e.g., especially by forward transmission delay since the HTTP response size would be significantly bigger than the HTTP request size. Forward transmission delay is mainly due to available bandwidth in the forward link. In this case, ALT can be shaped by controlling forward link speed. When propagation and queuing delays are significant, such as with broadband satellite communications links (e.g., in a geosynchronous satellite system, where propagation delay in one direction is about 300 msec), shaping forward link speed alone is not sufficient for accurate and effective shaping the ALT.

According to example embodiments, therefore, the rate shaping algorithm dynamically measures playback rate (PBR) per segment, computes a current playback rate estimate ($PBR_{Estimate}$), and compares the estimated PBR against the desired PBR $PBR_{Desired}$ to determine when a reduction of the ALT is required. According to one such embodiment, in the event that the RSE determines that the ALT must be reduced, the RSE may first perform an optional step of determining whether some of the segments (and which segments) should be filtered out to not be considered in the ALT adjustment (e.g., some segments may be left out of the consideration when segment size is significantly smaller than the average segment size for a playback rate). The RSE then compares the $ALT_{Measured}$ for the current segment to the $ALT_{Required}$ for the desired PBR. If $ALT_{Measured} > ALT_{Required}$, then the RSE adds a delay ($Delay_{Add}$) to the measured RTT ($RTT_{Measured}$) (e.g., holds the HTTP response segment for a requisite period of time) such that $ALT_{Measured} = ALT_{Required}$. According to one such embodiment, the delay to be added may be computed as follows:

$$Delay_{Add} = RTT_{Measured} * \left( \frac{ALT_{Measured}}{Alt_{Required}} - 1 \right)$$

The RSE then releases the current response video segment to the client playback device after holding the segment for the additional $Delay_{Add}$ time period.

Figure 9:
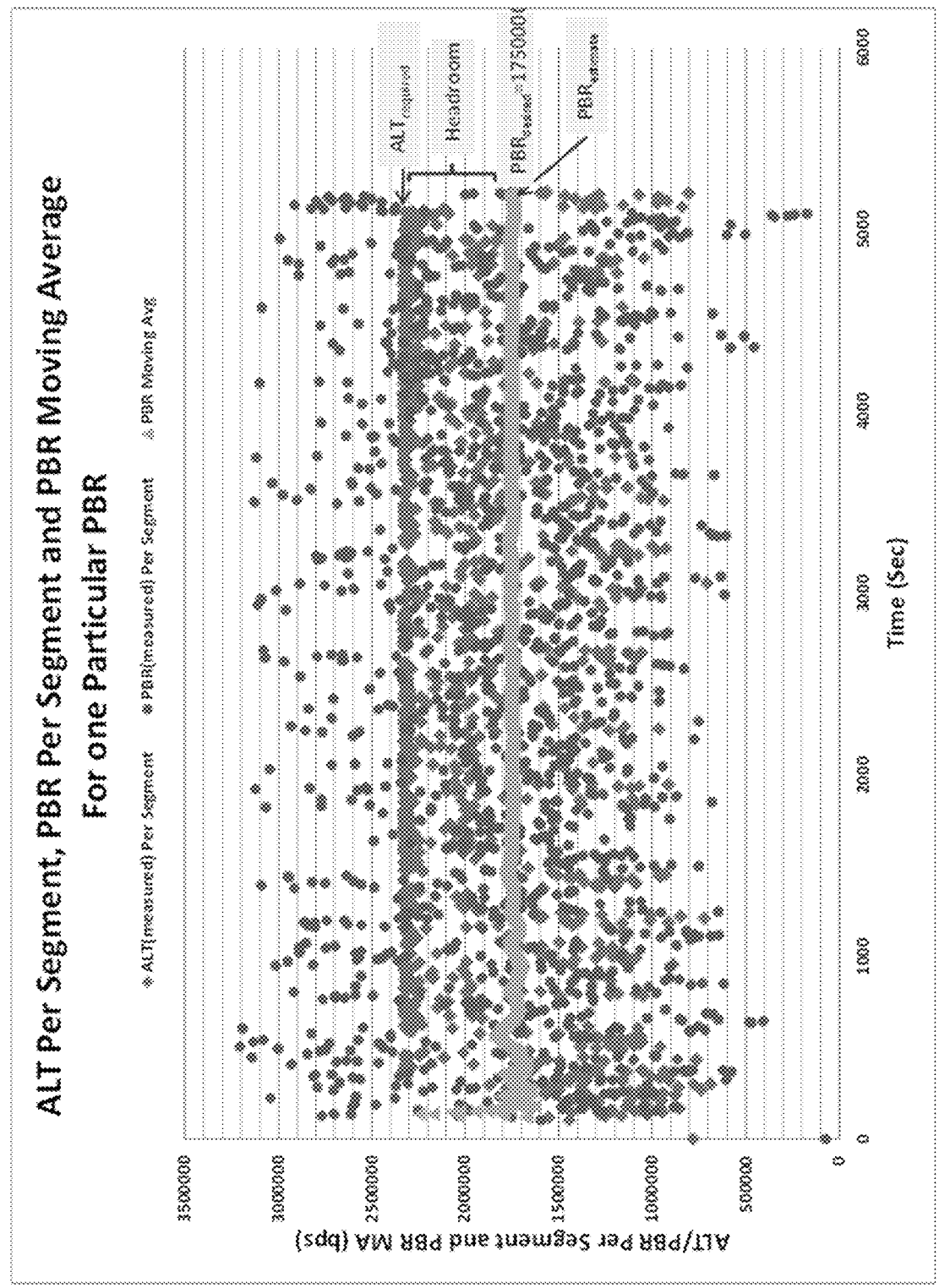
FIG. 9 illustrates a graph depicting an example of the application of the ALT and PBR to the segments of a video file, in accordance with example embodiments.

FIG. 9 illustrates a graph depicting an example of the application of the ALT and PBR to the segments of a video file, in accordance with example embodiments of the present invention, where $PBR_{Desired}$=1,750,000 bps, the headroom is 35%, and consequently $ALT_{Required}$=2,360,000 bps. Although the values of the per segment PBR vary, the statistical average of the per segment PBR ($PBR_{Estimate}$) provides an accurate estimate of 1,750,000 bps. The ALT values are capped at $ALT_{Required}$.

Use of the playback rate estimate for application layer shaping in an adaptive media or video streaming system, as described above, provides accurate and effective control of the playback rate of the respective client playback device/application. Employment of the algorithm with the use of a playback rate estimate, however, requires the knowledge of respective segment durations and the extraction of ephemeral video file metadata information, such as the video file ID and the video content or title ID from the HTTP URLs and HTTP header fields. The video file ID is used to sort the video segments into different video file groups corresponding to different respective playback rates.

Figure 10:
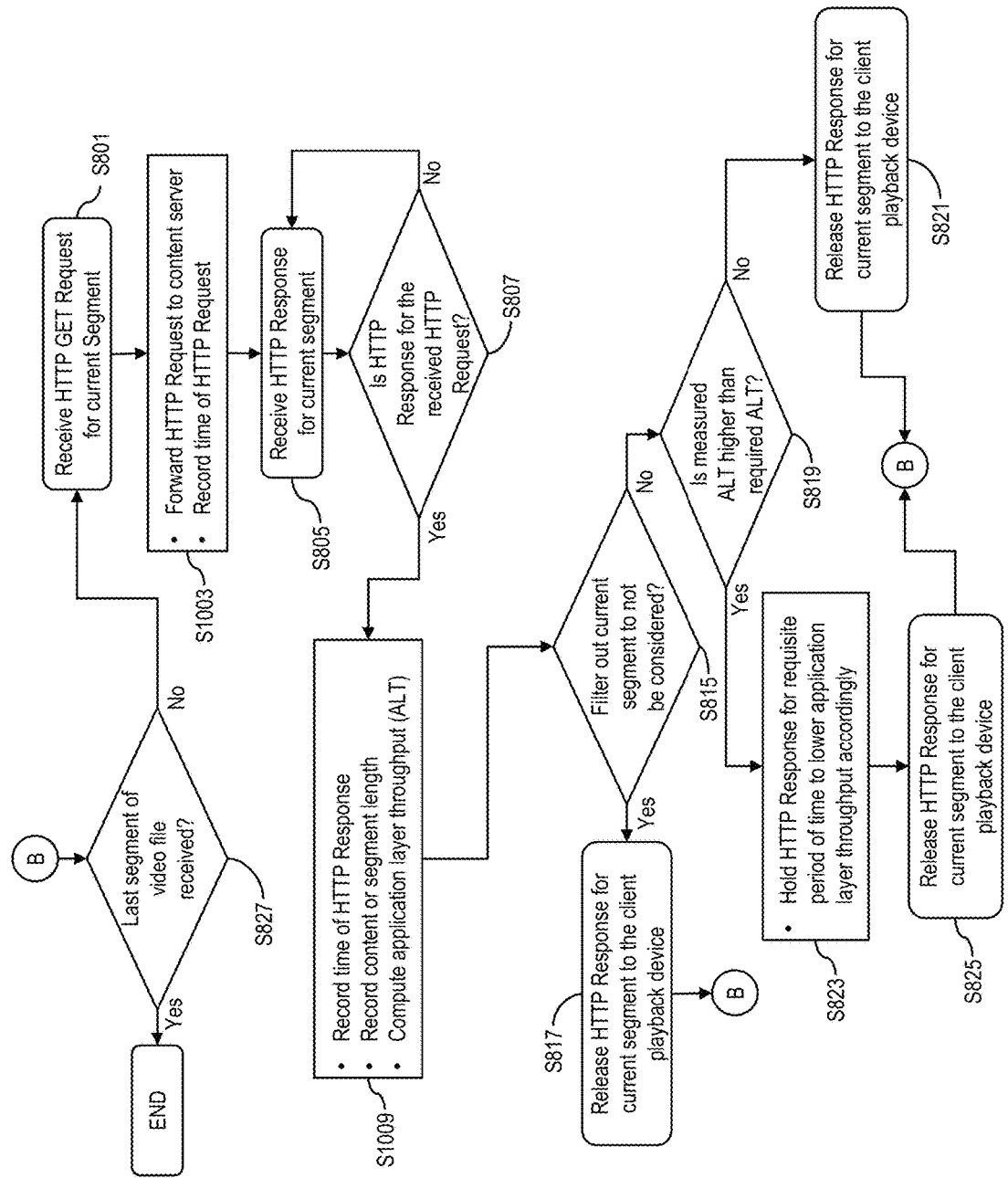
FIG. 10 illustrates a flow chart depicting an application layer shaping algorithm performed by the RSE, without utilization of a current playback rate estimate ($PBR_{Estimate}$), in accordance with example embodiments.

According to further example embodiments, however, the application layer shaping algorithm of such embodiments can be employed without utilizing a current estimate of the playback rate ($PBR_{Estimate}$). FIG. 10 illustrates a flow chart depicting an application layer shaping algorithm performed by the RSE, without utilization of a current playback rate estimate ($PBR_{Estimate}$), in accordance with example embodiments of the present invention. The algorithm flow of FIG. 10 mirrors that of FIG. 8 (as described above), except that (1) in Step S1003, the RSE forwards the request to the content server and records the time of receipt of the HTTP Request (the RSE does not also record the content file name and content length, as in S803 of FIG. 8), (2) in Step S1009, the reception time of the HTTP response is recorded and the content length is recorded, and the ALT is computed (the estimate of the current playback rate is not computed, as in S809 of FIG. 8), (3) the steps S811 and S813 are not performed, and instead the Step S1009 is followed by the Step S815. Without the use of the playback rate estimate, however, the headroom for the desired PBR must be set more accurately.

Currently, major video streaming providers use HTTP protocol for video streaming, and protect the video and audio files via digital rights management (DRM) processes (e.g., encryption). In the event that a video content provider were to utilize HTTPS for streaming of digital media content, algorithms according to further example embodiments of the present invention may be employed for application-layer rate shaping to control desired playback rates in media streaming systems. When video streaming content is transmitted via HTTPS, the information of the HTTP URLs and header fields in the HTTP request and response messages is no longer visible to the RSE. Although the video file ID is no longer available with HTTPS, however, the current playback rate can still be estimated, for example, based on the distribution of the video segment sizes. Further, the content length field in the HTTP response would also no longer be accessible by the RSE with HTTPS, so the content length may be computed, for example, based an estimate of the HTTP response size.

According to one embodiment, the respective segment sizes can be estimated based on a series of factors. By way of example, because the video segments of a given PBR are of "S" second durations, most of the HTTP requests are issued approximately every S seconds, and as a result, there would be a measurable gap between HTTP responses. Further, the length field in a transport layer security (TLS) protocol (HTTPS consists of TLS applied on top of HTTP) record layer header can be used to identify TLS record layer Application Data segments. The TLS record layer header is not encrypted and is transmitted in the clear in current TLS protocol versions. Additionally, the IP packet payload length can also be used to group TLS record layer Application Data segments into video segments. A link in the transmission path between the content server and the client playback device has a limitation on the size of an IP packet, which is known as a Maximum Transmission Unit (MTU). Usually, the MTU of an IP packet is 1500 Bytes, and an IP packet of a size less than the MTU, received after a sequence of packets of sizes equal to the MTU, may indicate the end of a video segment.

By way of further example, the unit of transmission at the TLS record layer is an "Application Data Block," which is typically 214 Bytes or 16 KB long. A video segment will be divided into one or more Application Data blocks depending on the segment size (e.g., if it is larger than 16 KB). Each Application Data block is preceded by a TLS record layer header, which generally includes a "Content Type" field and a "Length" field. The Content Type field indicates whether the respective Application Data Block carries "Application Data" in TLS record and the Length field indicates the length of the respective Application Data Block. According to this embodiment, the RSE can thus track TLS record layer Application Data Blocks in a stream of IP packets received from the content server. The content length of a segment can be constructed from the sizes of TLS record layer Application Data blocks.

Figure 11:
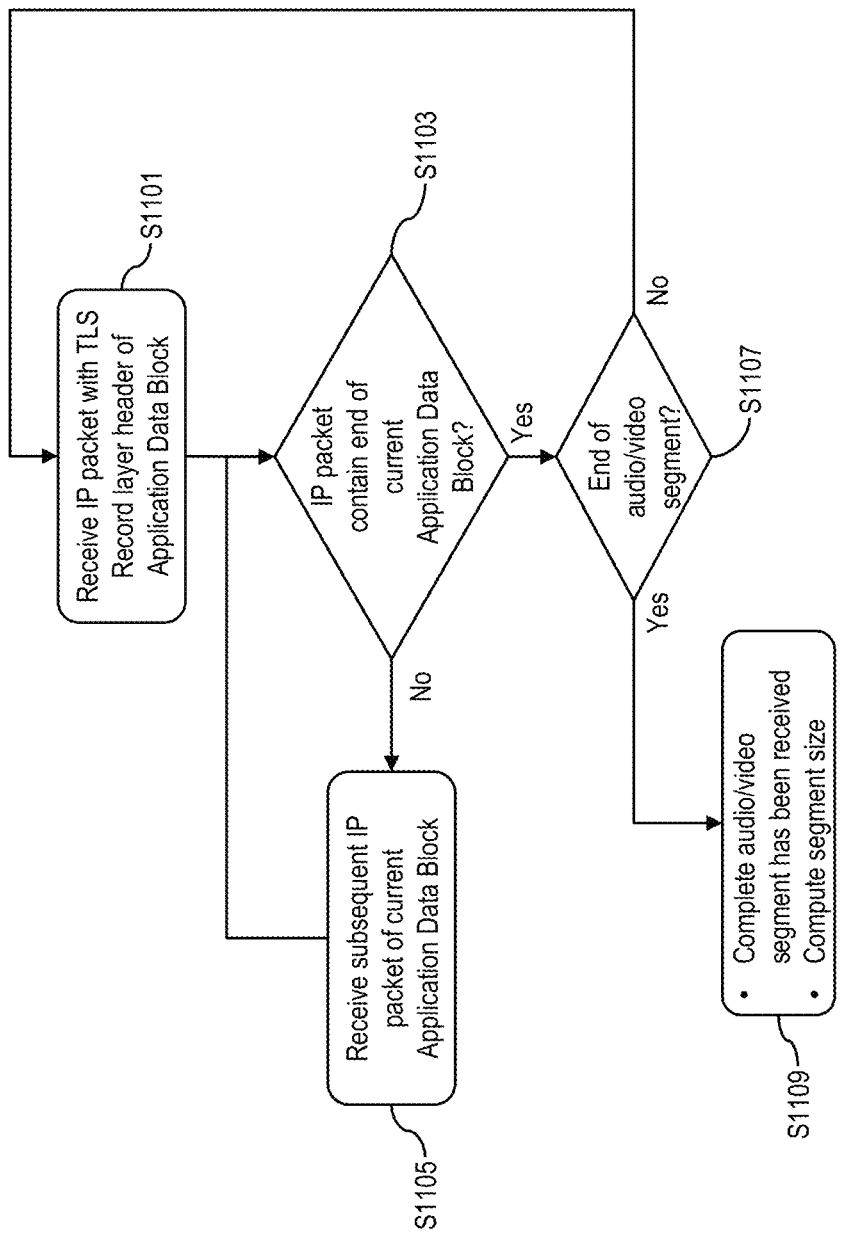
FIG. 11 illustrates a flow chart depicting an algorithm for estimating the content length of a video segment based on the received TLS record layer packets, in accordance with example embodiments.

FIG. 11 illustrates a flow chart depicting an algorithm for estimating the content length of a video segment based on the received TLS record layer packets, in accordance with example embodiments of the present invention. In a first step, the RSE receives an IP packet with a TLS record layer header for a respective Application Data Block (S1101). The RSE then makes a determination as to whether the IP packet contains an end of the current Application Data Block (S1103). The end of a TLS record layer Application Data Block can be determined by checking the cumulative sum of TCP payloads in the stream of IP packets against the value of the length field in the respective TLS record layer header—making sure not to double count duplicate TCP packets retransmitted by TCP protocol. In the event that the RSE determines that the IP packet does not contain the end of the current Application Data Block, the RSE waits to receive the next IP packet of the respective TLS record layer Application Data Block (S1105), and, once received, the algorithm loops back to determine whether the subsequent IP packet contains the end of the current TLS record layer Application Data Block (S1103). Alternatively, in the event that the RSE determines that the IP packet contains the end of the current TLS record layer Application Data Block, the RSE then makes a determination as to whether the current Application Data Block contains the end of a current audio/video segment (S1107). The end of a segment can be determined by a time gap between two TLS record layer Application Data Blocks. In the event that the RSE determines that the current Application Data Block does not contain the end of the current audio/video segment, the RSE waits to receive the IP packet with TLS record layer header for the next Application Data Block (S1101). Alternatively, in the event that the RSE determines that the current Application Data Block contains the end of the current audio/video segment, the RSE then determines that a complete audio/video segment has been received, and computes the segment size of the respective audio/video segment (S1109).

Figure 12:
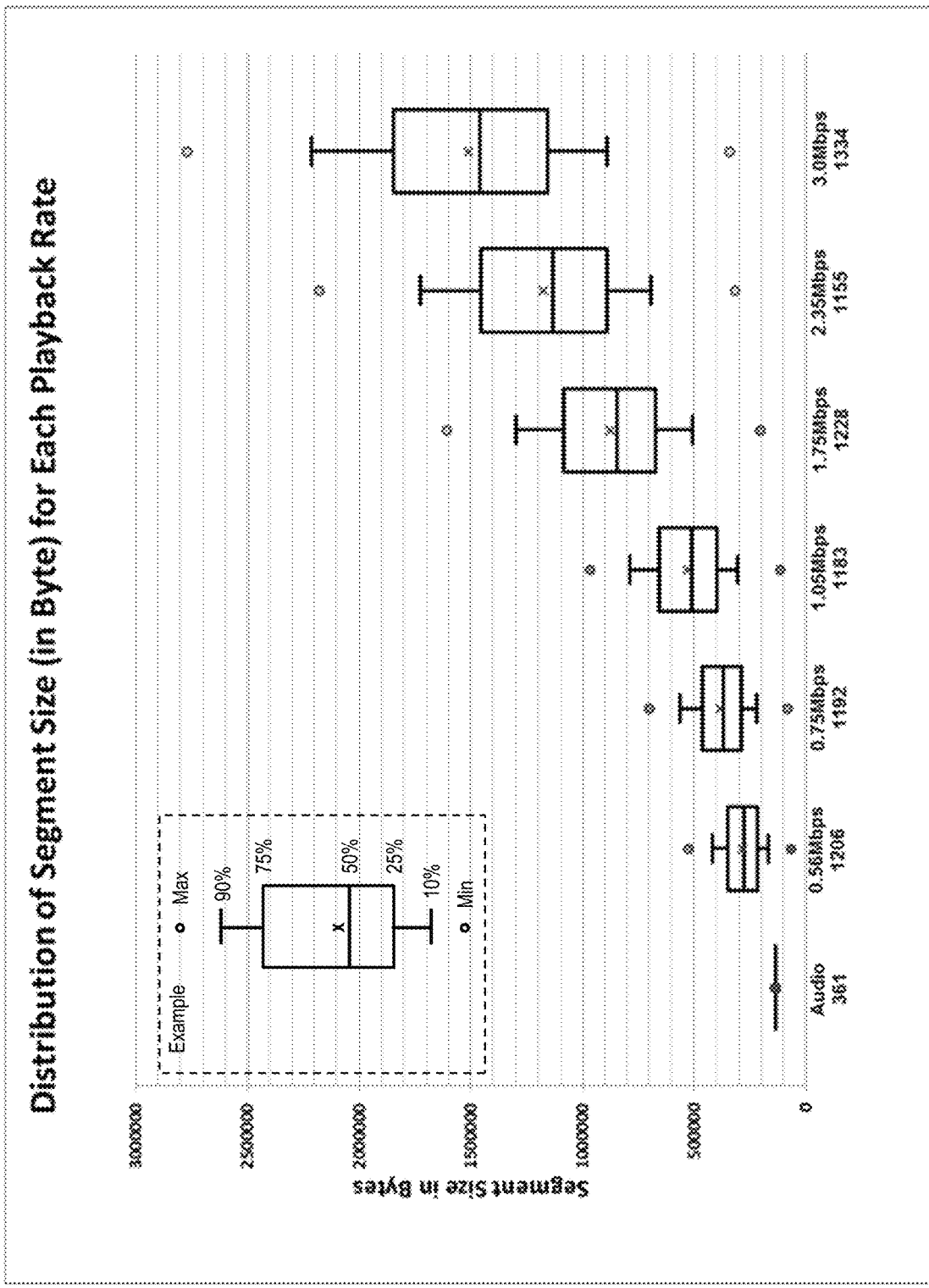
FIG. 12 illustrates a graph depicting an example segment size distribution for an audio file of a specific playback rate, and for several video files, each of a specific playback rate (PBR), in accordance with example embodiments.

FIG. 12 illustrates a graph depicting an example segment size distribution for an audio file of a specific playback rate, and for several video files, each of a specific playback rate (PBR), in accordance with example embodiments of the present invention—the depicted video file playback rates are 0.56 Mbps, 0.75 Mbps, 1.05 Mbps, 1.75 Mbps, 2.35 Mbps, and 3.0 Mbps. According to one embodiment, in order to exclude outlier values, a cut-off distribution with a lower bound (lb) and an upper bound (ub) PBR, based on the corresponding lower and upper bounds for the respective segment sizes, can be considered as follows:

[$PBR_{lb}(i), PBR_{ub}(i)$] for each $PBR(i)$ where $PBR(i)$ is an average playback rate, i, and $PBR_{lb}(i)$ and $PBR_{ub}(i)$ are the lower and upper cut-off points, respectively. An example of the cut-off point can be obtained as follows:

$$PBR_{lb}(i) = (1-CutOff)*PBR(i)$$

$$PBR_{ub}(i) = (1+CutOff)*PBR(i)$$

where CutOff is between 0 and 1. By way of example, the CutOff value may be set as 0.5. Further, according to example embodiments, the CutOff value can be set differently for different PBR files to have different values of lower and upper boundaries in general.

Figure 13:
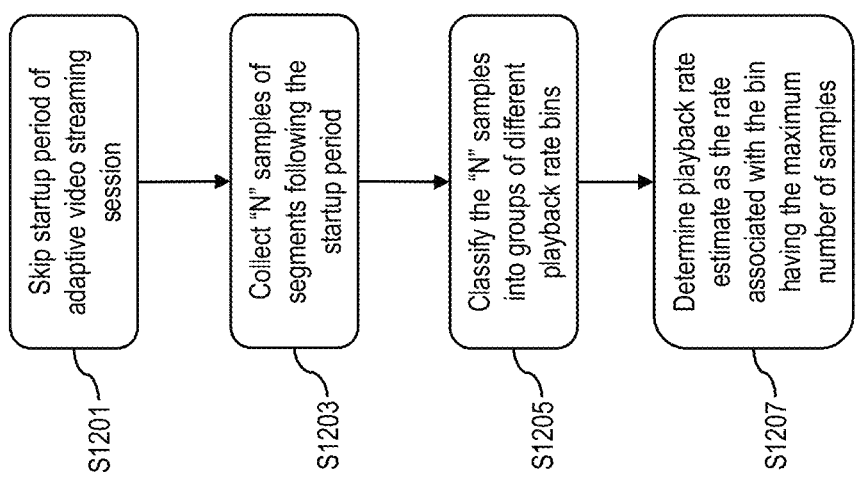
FIG. 13 illustrates a flow chart depicting an algorithm for estimating the current playback rate, in accordance with example embodiments.

FIG. 13 illustrates a flow chart depicting an algorithm for estimating the current playback rate, in accordance with example embodiments of the present invention. In a first step, a startup period for the adaptive video streaming session is skipped (S1201)—e.g., an example of a startup period can be as short as 100 sec and can be as long as 10 minutes. The startup period should be determined as a sufficient period of time for the playback rate of the session to stabilize. After the startup period, "N" samples of video/audio segments are collected (S1203). The "N" are then classified into video file groups or bins of different respective playback rates (S1205), based on respective upper and lower bounds, [$PBR_{lb}(i), PBR_{ub}(i)$], for the respective playback rate, $PBR(i)$. Note that some samples may fall into more than one bin. The playback rate is then estimated as the rate associated with the bin having the maximum number of samples (S1207). If "N" is sufficiently large, the estimated playback rate can represent the current playback rate of the client playback device/application.

According to the present embodiment, computation of the application layer throughput (ALT) requires an RTT for an HTTP request/response pair. In order to determine the RTT, an HTTP request and a corresponding HTTP response need to be associated. Although the association in HTTPS may not be as obvious as that in HTTP, the association can still be estimated. By way of example, when there is a noticeable gap between two consecutive HTTPS requests (which may represent the usual case), the RTT can be computed as described above. Alternatively, when HTTP requests arrive relatively close to each other, the response must be delivered by the content server in the order of receipt of HTTP requests in HTTP/1.1 pipelining. Even in HTTP/2 or SPDY, the response should be delivered in the order of receipt of the HTTP requests, as all responses are of the same priority because video segments are played back sequentially by the client playback device. A group of requests can thus be associated with a respective group of corresponding responses, when the requests are close to one another and the responses may be close to one another or may even be overlapping to one another. The aggregation of request/response pairs can be used as follows to compute application layer throughput:

$RTT_{Measured}$=RSE receipt time of last Response– RSE receipt time of first Request Segment-Size=Sum of content length of all responses corresponding to respective group of requests In view of the foregoing, according to such example embodiments for video streaming over HTTPS protocol, two approaches may be employed for application layer throughput shaping for video streaming over HTTPS. According to one embodiment, the application throughput shaping algorithm is similar to the algorithm depicted in FIG. 8, based on the associated determination of the estimated playback rate and the determination of the respective application layer throughput, described above with respect to FIG. 8. According to a further embodiment, the application throughput shaping algorithm, without use of a playback rate estimate, is similar to the algorithm depicted in FIG. 10, based on the determination of the respective application layer throughput, described above with respect to FIG. 8 and FIG. 10.

Figure 14:
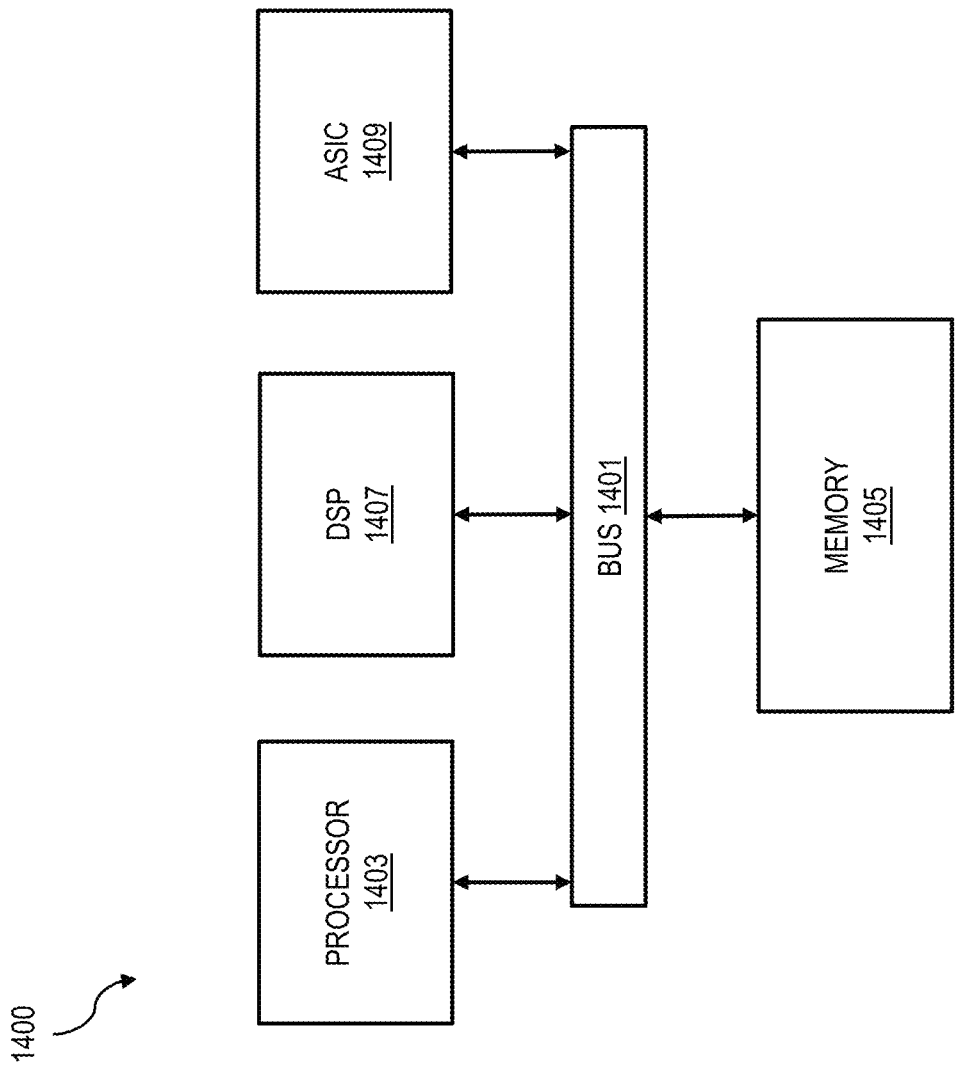
FIG. 14 illustrates a block diagram of a chip set implementing aspects of opportunistic caching approaches, in accordance with example embodiments.

FIG. 14 illustrates a block diagram of a chip set 1400 implementing aspects of approaches for application layer traffic rate shaping for adaptive media streaming, in accordance with example embodiments of the present invention.

Chip set 1400 includes, for instance, processor and memory components incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 1400 includes a communication mechanism such as a bus 1401 for passing information among the components of the chip set. A processor 1403 has connectivity to the bus 1401 to execute instructions/programs and process information stored in, for example, a memory 1405. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 1407, and/or one or more application-specific integrated circuits (ASIC) 1409. A DSP typically is configured to process real-time signals (e.g., sound or video) in real time independently of the processor. Similarly, the ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 1403 and accompanying components have connectivity to the memory 1405 via the bus 1401. The memory may include both dynamic memory (e.g., RAM) and static memory (e.g., ROM) for storing executable instructions that, when executed by the processor and/or the DSP 1407 and/or the ASIC 1409, perform the process of example embodiments as described herein. The memory may also store the data associated with or generated by the execution of the process.

Further, the functionality of the example embodiments of the present invention may be provided by the chip set 1400, in response to the processor 1403 executing an arrangement of program instructions contained in memory 1405. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 15:
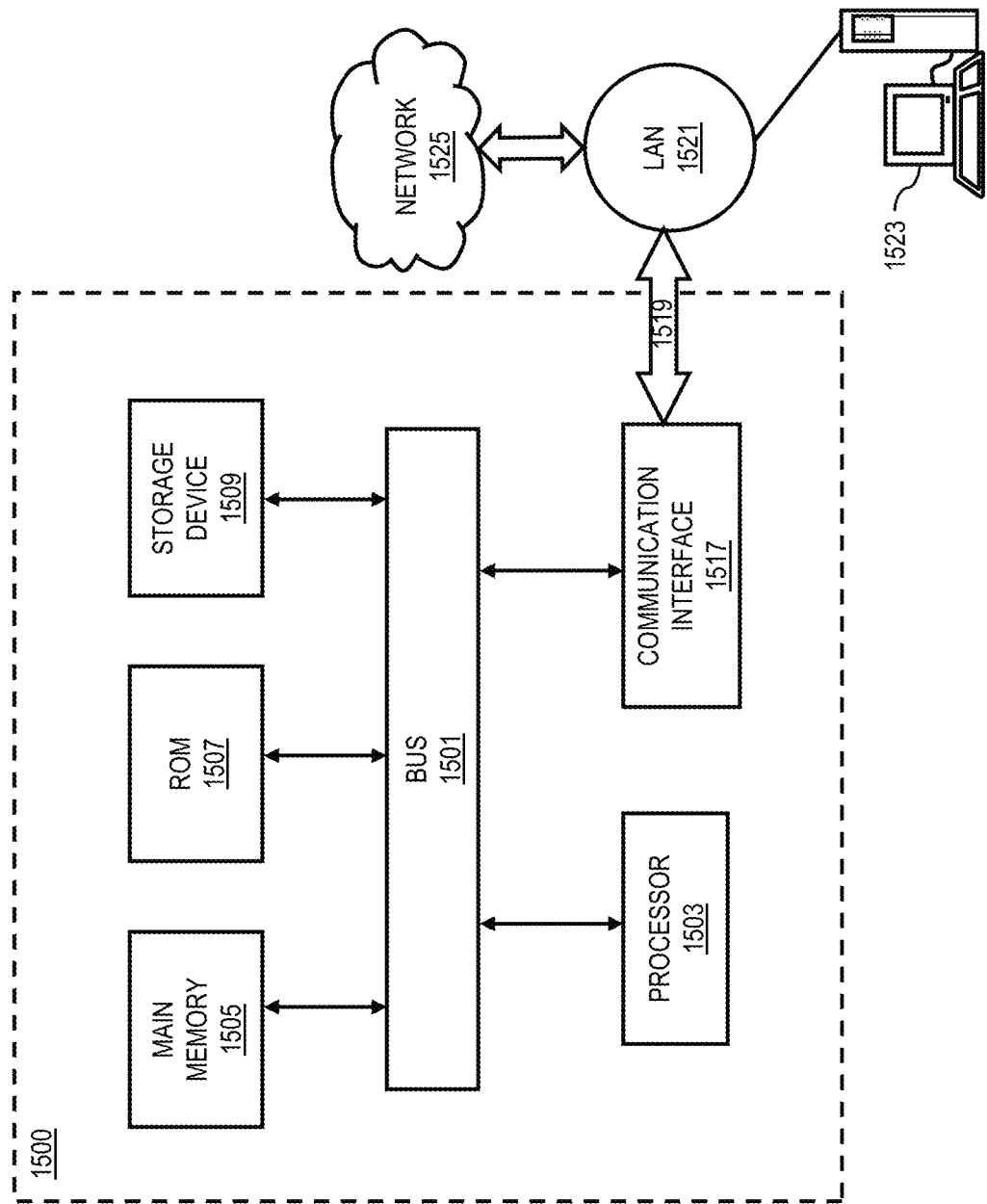
FIG. 15 illustrates a block diagram of a computer system implementing aspects of opportunistic caching approaches, in accordance with example embodiments.

FIG. 15 illustrates a block diagram of a computer system implementing aspects of approaches for application layer traffic rate shaping for adaptive media streaming, in accordance with example embodiments of the present invention. The computer system 1500 includes a bus 1501 or other communication mechanism for communicating information, and a processor 1503 coupled to the bus for processing information. The computer system also includes main memory 1505, such as a random access memory (RAM) or other dynamic storage device, coupled to the bus for storing information and instructions to be executed by the processor. Main memory can also be used for storing temporary variables or other intermediate information during execution of instructions to be executed by the processor. The computer system further includes a read only memory (ROM) 1507 or other static storage device coupled to the bus for storing static information and instructions for the processor. A storage device 1509, such as a magnetic disk or optical disk, is additionally coupled to the bus for storing information and instructions.

According to one embodiment of the invention, dynamic and flexible approaches for application layer traffic rate shaping for adaptive media streaming, are provided by the computer system 1500 in response to the processor 1503 executing an arrangement of instructions contained in main memory 1505. Such instructions can be read into main memory from another computer-readable medium, such as the storage device 1509. Execution of the arrangement of instructions contained in main memory causes the processor to perform the process steps described herein. One or more processors in a multi-processing arrangement may also be employed to execute the instructions contained in main memory. In alternative embodiments, hard-wired circuitry is used in place of or in combination with software instructions to implement the embodiment of the present invention. Thus, embodiments of the present invention are not limited to any specific combination of hardware circuitry and software.

The computer system 1500 also includes a communication interface 1517 coupled to bus 1501. By way of example, the communication interface provides a two-way data communication coupling to a network link 1519 connected to a local network 1521. The communication interface, for example, may be a digital subscriber line (DSL) card or modem, an integrated services digital network (ISDN) card, a cable modem, or other modem to provide a data communication connection to a corresponding type of telephone line. As another example, communication interface may be a local area network (LAN) card (e.g. for Ethernet™ or an Asynchronous Transfer Mode (ATM) network) to provide a data communication connection to a compatible LAN, or an optical modem configured to provide communications with a fiber-optic network link. Wireless links can also be implemented. Further, the communication interface, for example, includes peripheral interface devices, such as a Universal Serial Bus (USB) interface, a PCMCIA (Personal Computer Memory Card International Association) interface, etc.

The network link 1519 typically provides data communication through one or more networks to other data devices. For example, the network link provides a connection through local network 1521 to a host computer 1523, which has connectivity to a network 1525, such as a private wide area network (WAN) or a public WAN (e.g., the Internet), or to data equipment operated by service provider. The computer system 1500 sends messages and receives data, including program code, through the network(s), via the network link 419 and the communication interface 1517. In the Internet example, a server (not shown) might transmit requested code or content belonging to an application program or service for implementing an embodiment of the present invention via the network 1525. The processor 1503 executes the transmitted code while being received and/or store the code in storage device, or other non-volatile storage for later execution.

Additionally, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving, by an application-layer throughput rate shaping device, a current content request message of a respective client device, the current content request message requesting a current content segment of a sequence of content segments of a streaming data file for a streaming data session of the client device, recording a time of receipt of the current content request message, and forwarding the current content request to a remote content server;

receiving, by the application-layer throughput rate shaping device, a current content response message transmitted by the content server in response to the forwarded current content request, the current content response including the requested current content segment, recording a time of receipt of the current content response message, determining a current segment size of the current content segment, and determining a current application-layer throughput (ALT) rate for the current content segment based on the time of receipt of the current content request message, the time of receipt of the current content response message and the current segment size; and determining, by the application-layer throughput rate shaping device, whether the current ALT rate is greater than a target ALT rate required to support a desired playback rate (PBR) for the streaming data session of the client device;

wherein, when it is determined that the current ALT rate is higher than the target ALT rate, the method further comprises holding the current content segment for a holding time determined to lower the current ALT rate to the target ALT rate, and providing the current content segment to the client device upon termination of the holding time, and wherein, when it is determined that the current ALT rate is not higher than the target ALT rate, the method further comprises promptly providing the current content segment to the client device.

2. The method according to claim 1:

wherein, as part of the step of receiving the current content response message, the method further comprises determining a current playback rate (PBR) of the streaming data session of the client device; and wherein, after the step of receiving the current content response message, the method further comprises determining whether the current PBR is higher than the desired PBR; and when it is determined that the current PBR is higher than the desired PBR, the method proceeds to the step of determining whether the current ALT rate is greater than the target ALT rate, and when it is determined that the current PBR is not higher than the desired PBR, the method further comprises promptly providing the current content segment to the client device, and the step of determining whether the current ALT rate is greater than the target ALT rate, along with the steps associated with the result of this determination, are not performed.

3. The method according to claim 2, wherein the determination of the current PBR comprises:

determining a measured PBR for the current content segment; and determining the current PBR as a statistical average of the measured PBR for the current content segment and the measured PBR for previously received content segments of the streaming data file.

4. The method according to claim 3, wherein the measured PBR ($PBR_{Measured}$) for the current content segment is determined as:

$$PBR_{Measured} = \frac{\text{Current Segment Size}}{\text{Time Duration of Current Segment}}.$$

5. The method according to claim 1:
wherein, before the step of determining whether the current ALT rate is greater than the target ALT rate required to support the desired PBR for the streaming data session of the client device, the method further comprises determining whether the current content segment should be filtered out;
wherein, when it is determined that the current content segment should be filtered out, the method further comprises promptly providing the current content segment to the client device, and the step of determining whether the current ALT rate is greater than the target ALT rate, along with the steps associated with the result of this determination, are not performed; and
wherein, when it is determined that the current content segment should not be filtered out, the method proceeds to the step of determining whether the current ALT rate is greater than the target ALT rate required to support the desired PBR for the streaming data session of the client device.

6. The method according to claim 1, wherein the current ALT ($ALT_{Measured}$) for the current content segment is determined as:

$$ALT_{Measured} = \frac{\text{Current Segment Size}}{RTT_{Measured}},$$

wherein $RTT_{Measured}$ is a measured round-trip time for the current content segment determined based on the time of receipt of the current content request message and the time of receipt of the current content response message.

7. The method according to claim 6, wherein the holding time ($Delay_{Add}$) for the current content segment is determined as:

$$Delay_{Add} = RTT_{Measured} * \left(\frac{ALT_{Measured}}{ALT_{Target}} - 1\right),$$

wherein $ALT_{Target}$ is the target ALT rate required to support a desired playback rate (PBR) for the streaming data session of the client device.

8. An application-layer throughput rate shaping device comprising:
a client device interface;
a network communications terminal interface; and
a rate-shaping processor;
wherein the client device interface is operable to receive a current content request message from a respective client device, the current content request message requesting a current content segment of a sequence of content segments of a streaming data file for a streaming data session of the client device,
wherein the network communications terminal interface is operable to forward the current content request to a remote content server, and to receive a current content response message transmitted by the content server in response to the forwarded current content request, the current content response including the requested current content segment,
wherein the rate-shaping processor is operable to record a time of receipt of the current content request message, to record a time of receipt of the current content response message, to determine a current segment size of the current segment, and to determine a current application-layer throughput (ALT) rate for the current segment based on the time of receipt of the current content request message, the time of receipt of the current content response message and the current segment size, and
wherein the rate shaping processor is further operable to determine whether the current ALT rate is greater than a target ALT rate required to support a desired playback rate (PBR) for the streaming data session of the client device,
wherein, when it is determined that the current ALT rate is higher than the target ALT rate, the rate shaping processor is further operable to hold the current content segment for a holding time determined to lower the current ALT rate to the target ALT rate and to release the current content segment upon termination of the holding time, and the client device interface is further operable to provide the current content segment to the client device once the response is released by the rate shaping processor, and
wherein, when it is determined that the current ALT rate is not higher than the target ALT rate, the rate shaping processor is further operable to promptly release the current content segment, and the client device interface is further operable to provide the current content segment to the client device once the response is released by the rate shaping processor.

9. The application-layer throughput rate shaping device according to claim 8:
wherein the rate shaping processor is further operable to determine a current playback rate (PBR) associated with the current content segment of the streaming data session of the client device;
wherein, before performing the determination whether the current ALT rate is greater than a target ALT rate, the rate shaping processor is further operable to determine whether the current PBR is higher than the desired PBR; and
wherein, when it is determined that the current PBR is higher than the desired PBR, the rate shaping processor is then operable proceed with the determination whether the current ALT rate is greater than a target ALT rate, and
wherein, when it is determined that the current PBR is not higher than the desired PBR, the rate shaping processor is further operable to promptly release the current content segment, and the client device interface is further operable to provide the current content segment to the client device once the response is released by the rate shaping processor, and wherein the determination whether the current ALT rate is greater than a target ALT rate, along with the functions associated with the result of that determination, are not performed.

10. The application-layer throughput rate shaping device according to claim 9, wherein the determination of the current PBR comprises:
determining a measured PBR for the current content segment; and
determining the current PBR as a statistical average of the measured PBR for the current content segment and the measured PBR for previously received content segments of the streaming data file.

11. The application-layer throughput rate shaping device according to claim 10, wherein the measured PBR ($PBR_{Measured}$) for the current content segment is determined as:

$$PBR_{Measured} = \frac{\text{Current Segment Size}}{\text{Time Duration of Current Segment}}.$$

12. The method according to claim 5, wherein the determination as to whether the current content segment should be filtered out is based on the segment size of the current content segment.

13. The application-layer throughput rate shaping device according to claim 8:
wherein, before performing the determination as to whether the current ALT rate is greater than the target ALT rate required to support the desired PBR for the streaming data session of the client device, the rate-shaping processor is configured to determine whether the current content segment should be filtered out;
wherein, in a case where the rate-shaping processor determines that the current content segment should be filtered out, the rate shaping processor is operable to promptly release the current content segment, and the client device interface is operable to provide the current content segment to the client device once the response is released by the rate shaping processor; and
wherein, in a case where the rate-shaping processor determines that the current content segment should not be filtered out, the rate shaping processor is operable to proceed with the determination as to whether the current ALT rate is greater than the target ALT rate required to support the desired PBR for the streaming data session of the client device.

14. The application-layer throughput rate shaping device according to claim 13, wherein the determination as to whether the current content segment should be filtered out is based on the segment size of the current content segment.

15. The application-layer throughput rate shaping device according to claim 8, wherein the current ALT ($ALT_{measured}$) for the current content segment is determined as:

$$ALT_{Measured} = \frac{\text{Current Segment Size}}{RTT_{Measured}},$$

wherein $RTT_{Measured}$ is a measured round-trip time for the current content segment determined based on the time of receipt of the current content request message and the time of receipt of the current content response message.

16. The application-layer throughput rate shaping device according to claim 15, wherein the holding time ($Delay_{Add}$) for the current content segment is determined as:

$$Delay_{Add} = RTT_{Measured} * \left(\frac{ALT_{Measured}}{ALT_{Target}} - 1\right),$$

wherein $ALT_{Target}$ is the target ALT rate required to support a desired playback rate (PBR) for the streaming data session of the client device.

* * * * *